(12) United States Patent
Metsger

(10) Patent No.: US 11,259,900 B2
(45) Date of Patent: Mar. 1, 2022

(54) CEMENTED DENTAL CROWN REMOVAL SYSTEM

(71) Applicant: L. Kevin Metsger, Greensburg, PA (US)

(72) Inventor: L. Kevin Metsger, Greensburg, PA (US)

(*) Notice: Subject to any disclaimer, the term of this patent is extended or adjusted under 35 U.S.C. 154(b) by 273 days.

(21) Appl. No.: 16/185,691

(22) Filed: Nov. 9, 2018

(65) Prior Publication Data

US 2020/0146787 A1    May 14, 2020

(51) Int. Cl.
*A61C 8/00* (2006.01)
*A61C 13/08* (2006.01)
*A61C 3/16* (2006.01)

(52) U.S. Cl.
CPC .............. *A61C 8/0089* (2013.01); *A61C 3/16* (2013.01); *A61C 13/08* (2013.01)

(58) Field of Classification Search
CPC .......... A61C 8/0089; A61C 3/16; A61C 13/08
See application file for complete search history.

(56) References Cited

U.S. PATENT DOCUMENTS

| | | | | |
|---|---|---|---|---|
| 2,591,451 A * | 4/1952 | Lynch | ....................... | A61C 3/16 433/152 |
| 3,653,127 A * | 4/1972 | Ballard | ..................... | A61C 3/16 433/152 |
| 3,690,006 A * | 9/1972 | Lozano | ..................... | A61C 3/16 433/161 |
| 3,747,215 A * | 7/1973 | Joyner, Jr. | ................ | A61C 5/70 433/219 |
| 3,755,901 A * | 9/1973 | Wilson | ...................... | A61C 3/16 433/161 |
| 4,179,816 A * | 12/1979 | Anderson | ................. | A61C 3/16 433/161 |
| 4,402,671 A * | 9/1983 | Westerman | ............... | A61C 3/16 433/152 |
| 4,417,876 A * | 11/1983 | Lynch | ...................... | A61C 3/16 433/161 |
| 4,547,157 A * | 10/1985 | Driskell | ............... | A61C 8/0018 433/173 |
| 4,609,353 A * | 9/1986 | Kline | ........................ | A61C 3/16 433/159 |
| 5,695,339 A * | 12/1997 | Abere | ....................... | A61C 5/30 433/218 |
| 6,669,476 B2 | 12/2003 | Prestipino et al. | | |
| 8,875,399 B2 | 11/2014 | Reed | | |
| 8,932,059 B2 | 1/2015 | Dukhan | | |
| 9,333,056 B2 | 5/2016 | Magnusson et al. | | |
| 9,398,939 B2 | 7/2016 | Morehead | | |
| 2011/0014585 A1* | 1/2011 | Seo | ....................... | A61C 8/0089 433/173 |

* cited by examiner

*Primary Examiner* — Nicholas D Lucchesi
*Assistant Examiner* — Hao D Mai
(74) *Attorney, Agent, or Firm* — Buchanan Ingersoll & Rooney PC; Craig G. Cochenour, Esq.

(57) ABSTRACT

A cemented dental crown removal system is provided having a base implant, an abutment, and a dental crown having a passageway with a sleeve with one or more female threads. The sleeve is in juxtaposition to the abutment. The sleeve accommodates a fastener element or a tool having one or more male threads that are positioned against the abutment. A method of removing a cemented dental crown is provided.

19 Claims, 9 Drawing Sheets

CEMENTED DENTAL CROWN REMOVAL SYSTEM

FIELD OF THE INVENTION

This invention relates to a cemented dental crown removal system. A novel dental crown is cemented to either a conventional tooth implant base and/or abutment or to a worn or damaged natural tooth. The cemented dental crown removal system of this invention provides a system such that a dental crown may be easily removed without damaging the underlying dental implant structure or an underlying natural tooth. The mechanical fastener element of the cemented dental crown system of this invention may be located (positioned) anywhere on and through the surface of the dental crown, however it is preferably placed in a position on the surface of the dental crown that is easily accessible to the dental professional.

BACKGROUND OF THE INVENTION

A dental crown is a tooth-shaped top component of a dental implant (described below), or may be a structure that is placed over a natural tooth in order to cover the natural tooth to restore its shape and size, strength, and improve its appearance. For example, but not limited to, a dental crown may be needed in the following situations: as a component of a dental implant structure; to protect a weak natural tooth (for instance, from decay) from breaking or to hold together parts of a cracked natural tooth; to restore an already broken natural tooth or a natural tooth that has been severely worn down; to cover and support a natural tooth having a large filling when there is not a sufficient amount of a natural occurring tooth remaining; and to cover poorly shaped or severely discolored natural teeth. Typically, a dental crown is the visible component of a dental implant that lies at and above the gum line of a patient and is cemented into place to an abutment of the dental implant. Further, a dental crown may be cemented to and fully encase the entire visible portion of a natural tooth that lies at and above the gum line of a patient.

A dental implant is a man-made (artificial) structure (prosthetic) tooth that is anchored in the gums or jawbone to replace a missing tooth. Thus, a dental implant generally has the appearance of a naturally occurring tooth sitting at and above the gum line. A typical known dental implant (1) is shown in FIG. 1 (FIG. 1) and is composed of generally three components, namely a base implant (2), an abutment (3), and a crown (400). The base implant (2) has a first end (5), a second end (6) that is opposite to the first end (5), and a middle section (7) that is disposed between the first end (5) and the second end (6) of the base implant (2) of the dental implant (1). Generally, at least the first end (5) of the base implant (2) of the dental implant (1) is inserted below the gum line of the patient. The abutment (3) has a first end (8), a second end (9) that is opposite to the first end (8) of the abutment (3), and a middle section (10) that is disposed between the first end (8) and the second end (9) of the abutment (3). The first end (8) of the abutment (3) is secured to or seated within the second end (6) of the base implant (2) of the dental implant (1). A crown (400) is cemented to at least a portion of the second end (9) of the abutment (3) of the dental implant (1) such that the crown (400) covers generally all of the dental implant (1) components that lie at and above the patient's gum line (i.e. at least the second end (9) of the abutment (3)). The dental implant (1) is inserted into a space of a natural tooth that is missing in a patient's dentition (i.e. a patient's natural teeth considered collectively in the dental arch (including both the mandibular dentition and the maxillary dentition)). The missing tooth of a patient's natural dentition may occur, for example, but not limited to, decay, fracture, or trauma to the original natural tooth, or due to the fact that the natural tooth was never formed in the patient's dentition.

Dental crowns are secured to the abutment of a dental implant or secured to a natural tooth with use of various polymers, cements, and adhesives, all of which are known by those persons skilled in the art, to create a secure physical and/or chemical bond between the underlying interior surface of the dental crown and the exterior surface of the abutment of the dental implant, or between the underlying interior surface of the dental crown and the natural tooth surface. When such known bonded dental crowns are required to be removed from the exterior surface of an abutment of a dental implant, or from the exterior surface of a natural teeth, the physical mechanical forces applied to the dental crown with the aid of a dental explorer or plier tool to release and break the polymer, adhesive, or cementitious bond between the interior surface of the dental crown and the exterior surface of an abutment of the dental implant, or the underlying exterior surface of a natural tooth, causes such trauma and damage to the underlying abutment and/or base implant of a dental implant, or the underlying natural tooth. Such damage or trauma results in the partial or total destruction of the dental implant's abutment and to the dental implant's base inserted through the patient's gum and into the patient's jawbone. Further, the dental crown itself is exposed to the harsh mechanical forces as well and is subject to being cracked, damaged, and misshapen so as not to be able to be reapplied to the dental abutment, or to the natural tooth, from whence it was removed. All of these situations result in considerable medical expense and pain to the patient.

Known dental implants have a crown that is made to mimic (imitate) a natural tooth. Today's commercially available and commonly employed dental implants are generally three piece systems In a typical three piece dental implant system known to those persons skilled in the art and shown in FIG. 1, the system comprises a base implant (i.e. mimics the root of a natural occurring tooth), an abutment (i.e. mimics a core of a naturally occurring tooth), and a crown (i.e. mimics the enamel portion of a naturally occurring tooth that appears at or near and above the gum line). In today's commercially available three piece dental implant system, at least a portion of the interior surface of the crown of the dental implant is secured to at least a portion of the exterior of the second end of the abutment generally with a cement, glue, polymer adhesive, or like substance, for establishing a water tight physical bond between at least a portion or all of the interior surfaces of the dental crown and at least a portion of the exterior surface of the second end of the dental abutment. Generally, most commercially available three piece dental implant systems contain an abutment that has a first end, a second end, and a middle section disposed between the first and second ends. At least all or a portion of the first end of the abutment is a male threaded end that is formed such that it is able to be mated to and secured to a female threaded second end of a base implant of the dental implant. The male threaded first end of the abutment is typically screwed into the female threaded second end of the base implant of the dental implant forming a mated and secured abutment and base configuration. In other words, the first end of the typical abutment of the dental implant is in the form of a male end screw that is mechanically mated into at least a portion of a female internally threaded second end of a base implant of the dental implant. It will be appreciated that the screw arrangement is such that the abutment may be unscrewed from the base implant of the dental implant if needed. Thus, this screw arrangement between the male first end of the abutment and the female second end of the base implant is mechanically reversible. It is well known in the background art that there are many ways in which to secure an abutment to a base implant of a dental implant. As known by those persons skilled in the art, at least a portion of or all of the base implant of the dental implant is placed within the area of the jawbone where a root of a natural tooth has been extracted therefrom. For example, but not limited to, many commercially available base implants of a dental implant generally have external threads that allow the base implant to be screwed into the jawbone. Subsequent to a successful dental implant being secured to the jawbone of a patient, over time, the abutment of the dental implant that is screwed (secured) to the base implant of the dental implant becomes loosened. In other words, the fastening (i.e. screw portion) of a standard abutment that internally holds the abutment to the base implant of the dental implant loosens over time. Not being bound by any particular theory, the loosening of the abutment from the base implant is thought to occur over time from the mechanical forces that are applied to the occlusal surfaces of the crown and surrounding teeth surfaces, or due to trauma to the implant area. A lose abutment of a dental implant necessarily causes unwanted movement of the crown that is physically secured to the abutment with a cement, or polymer, as discussed above. A loosened abutment will eventually destroy the secure nature of the base implant of the dental implant seated in the jawbone and will certainly result in a partial or total failure of the overall dental implant. The patient will also experience irritated gums and painful sensitivity from the loosened abutment. To remedy the loosened fastener (i.e. screw) of the abutment of the dental implant that was formerly tightly secured (rigidly secured) to the base implant, the abutment screw must be re-tightened and re-secured to the base implant of the dental implant. To affect this remedy, the dental professional must mechanically remove the crown of the dental implant that is physically bonded to at least a portion of the second end of the abutment of the dental implant. Removing the dental crown from the abutment of the dental implant entails breaking the physical bond between the interior surfaces of the crown and the exterior portion of the abutment. Most often, this mechanical force not only destroys the crown that is sought to be removed, but also further destabilizes the base of the dental implant that is seated into the jawbone of the patient. Such effects cause considerable harm to a patient in the form of the expense of a dental professional's time involved to repair the loosened abutment, and laboratory cost for replacement of the damaged removed crown, pain to the patient's gums and mucosal areas and possible infection of the gum and jawbone, and lost work (wages) or leisure time. The present invention provides a cemented dental crown removal system that may be easily effect the crown's safe removal from (1) a dental abutment that is secured to a base implant of a dental implant, or (2) overlying a natural tooth.

SUMMARY OF THE INVENTION

The present invention provides a cemented dental crown removal system and method of safely and easily removing a cemented dental crown from an abutment of a dental implant or from a naturally occurring tooth. The present invention thereby solves the present unmet need for a dental crown removal system that effectively removes a cemented dental crown from its underlying structure without causing trauma and destruction to the underlying abutment of a typical dental implant, or to an underlying natural tooth to which the dental crown is secured. A novel dental implant having a novel dental crown is provided in this invention.

FIG. 2 (FIG. 2), 3 (FIG. 3), 4A (FIG. 4A), 4B (FIG. 4B), 4C (FIG. 4C), 4D (FIG. 4D), 5 (FIG. 5), 6 (FIG. 6), 7 (FIG. 7), 8 (FIG. 8), and 9 (FIG. 9) show various embodiments of the cemented dental crown removal system of this invention.

FIG. 1 (FIG. 1) shows a known dental implant (1) having a base implant (2), an abutment (3), and a conventional dental crown (400); wherein the base implant (2) has a first end (5), a second end (6), and a middle section (7) disposed between said first end (5) and said second end (6) of the base implant (2), and wherein the abutment (3) has a first end (8), a second end (9), and a middle section (10) disposed between the first end (8) and the second end (9) of the abutment (3), wherein the first end (8) of the abutment (3) is secured within the second end (6) of the base implant (2). Many of the reference numerals shown in FIG. 1 for the base implant (2) and the abutment (3) are also shown in FIGS. 2, 3, 4A, 4B, 4C, and 4D for the base implant and the abutment of the present invention. The novelty of the cemented dental crown removal system of this invention is presented in FIGS. 2, 3, 4A, 4B, 4C, 4D, 5, 6, 7, 8, and 9.

In one embodiment of this invention (as shown in FIGS. 1, 2, 3, 4A, 4B, 4C, 4D, 5, 6, 7, 8, and 9), a cemented dental crown removal system is provided comprising a base implant (2), an abutment (3), and a novel dental crown (4); wherein the base implant (2) has a first end (5), a second end (6), and a middle section (7) disposed between said first end (5) and said second end (6) of said base implant (2); wherein said abutment (3) has an exterior surface (16) and a first end (8), a second end (9), and a middle section (10) disposed between said first end (8) and said second end (9) of said abutment (3), wherein said first end (8) of said abutment (3) is secured within said second end (6) of said base implant (2), and wherein said second end (9) of said abutment (3) has a top surface (17); wherein said dental crown (4) has an exterior occlusal wall (11), an interior occlusal wall (19), and an occlusal middle section (20) that is disposed between said exterior occlusal wall (11) and said interior occlusal wall (19), a mesial wall (12), a distal wall (13), an exterior buccal wall (14), an interior buccal wall (25), and a buccal middle section (26) that is disposed between said exterior buccal wall (14) and said interior buccal wall (25), an exterior lingual wall (15), an interior lingual wall (27), and a lingual middle section (28) that is disposed between said exterior lingual wall (15) and said interior lingual wall (27), and an open end (18) that is opposite to said exterior occlusal wall (11), and wherein said exterior occlusal wall (11), said mesial wall (12), said distal wall (13), said exterior buccal wall (14), said exterior lingual wall (15), said interior occlusal wall (19), said interior buccal wall (25), and said interior lingual wall (27) form a cup like tooth shape of said dental crown (4); wherein said mesial wall (12) is in juxtaposition to said exterior lingual wall (15), said exterior buccal wall ((14), and said exterior occlusal wall (11); wherein said exterior buccal wall (14) is in juxtaposition to said mesial wall (12), said distal wall (13), and said exterior occlusal wall (11); wherein said distal wall (13) is in juxtaposition to said exterior buccal wall (14), said exterior lingual wall (15), and said exterior occlusal wall (11); wherein said exterior lingual wall (15) is in juxtaposition to said distal wall (13), said mesial wall (12), and said exterior occlusal wall (11); and wherein said exterior occlusal wall (11) is in juxtaposition to said mesial wall (12), said exterior buccal wall (14), said distal wall (13), and said exterior lingual wall (15), such that said mesial wall (12), said exterior buccal wall (14), said distal wall (13), and said exterior lingual wall (15) each extend in a vertical direction away from a horizontal plane of said exterior occlusal wall; and wherein said interior occlusal wall (19) is positioned below said occlusal middle section (20), and wherein said interior buccal wall (25) is in juxtaposition to said interior occlusal wall (19), and wherein said interior lingual wall (27) is in juxtaposition to said interior occlusal wall (19), and wherein said interior lingual wall (27) is spaced apart and opposite to said interior buccal wall (25), and wherein said interior buccal wall (25), said interior lingual wall (27), and said interior occlusal wall (19) form said open end (18) of said dental crown (4); and wherein a portion of said exterior occlusal wall (11) has a hole (or void) (29) located on said exterior occlusal wall (11), wherein said hole (or void) (29) extends through said exterior occlusal wall (11), through said occlusal middle section (20), and through said interior occlusal wall (19) of said dental crown (4) forming a first passageway (30) that extends through said exterior occlusal wall (11), through said occlusal middle section (20), and said interior occlusal wall (19); a sleeve (FIG. 5, 32) that is located within said hole (29) of said exterior occlusal wall (11) and said first passageway (30), wherein said sleeve (32) has an exterior surface (33), a cylindrically shaped interior surface (34), and a middle section (35) disposed between said exterior surface (33) of said sleeve (32) and said interior surface (34) of said sleeve (32), and wherein said sleeve (32) has a first end (36), and a second end (37), wherein said second end (37) of said sleeve (32) is disposed opposite to said first end (36) of said sleeve (32), and wherein said sleeve (32) has a vertical length (38) extending from said first end (36) of said sleeve (32) through said second end (37) of said sleeve (32), wherein at least a portion of said vertical length (37) of said sleeve (32) extends through said exterior occlusal wall (11), said occlusal middle section (20), and said interior occlusal wall (19) of said dental crown (4), and wherein said cylindrically shaped interior surface (34) of said sleeve (32) has one or more female threads (39), and wherein said second end (37) of said sleeve (32) is in juxtaposition to said exterior surface (16) of said abutment (3) or to said top surface (17) of said second end (9) of said abutment (3); and a fastener element (40) having a top exterior surface (41) having a diameter, a body (45) having a first end (42), and a second end (43), and a middle section (44) that is disposed between said first end (42) of said body (45) and said second end (43) of said body (45), wherein said body (45) of said fastener element (40) is in juxtaposition to and disposed below said top exterior surface (41) of said fastener element (40), and wherein said body (45) of said fastener element (40) has a diameter that is smaller than said diameter of said top exterior surface (41) of said fastener element (40), and wherein said top exterior surface (41) of said fastener element (40) forms a head (46) of said fastener element (40), and wherein said body (45) of said fastener element (40) has one or more male threads (47); and wherein said one or more of said male threads (47) of said body (45) of said fastener element (40) engages one or more of said female threads (39) of said cylindrically shaped interior surface (34) of said sleeve (32).

In another embodiment of this invention, the cemented dental crown removal system of this invention, as described herein, includes wherein said first end (42) of said fastener element (40) is engaged within said first end (36) of said sleeve (32).

In another embodiment of this invention, the cemented dental crown removal system of this invention, as described herein, includes wherein said fastener element (40) is a pin or a screw.

In another embodiment of this invention, the cemented dental crown removal system of this invention, as described herein, includes wherein said body (45) of said fastener element (40) is of a length that is suitable for extending into a portion of said vertical length (38) of said sleeve (32).

In another embodiment of this invention, the cemented dental crown removal system of this invention, as described herein, includes wherein said head (46) of said fastener element (40) is engaged against said exterior occlusal wall (11) of said dental crown (4).

In another embodiment of this invention, the cemented dental crown removal system of this invention, as described herein, includes wherein a diameter of said top exterior surface (41) of said fastener element (40) is larger than a diameter of said body (45) of said fastener element (40) and a diameter of said interior surface (34) of said sleeve (32), so that a portion of or all of said top exterior surface (41) of said fastener element (40) is retained on at least a portion of the exterior occlusal wall (11) of said dental crown (4).

In another embodiment of this invention, the cemented dental crown removal system of this invention, as described herein, includes wherein said fastener element (40) is mechanically turned or rotated in a circular 360 degree motion, either (i) clockwise to engage said one or more male threads (47) of said fastener element (40) against one or more of said female threads (39) of said sleeve (32) to seat at least a portion of said body (45) of said fastener element (40) within said interior surface (34) of said sleeve (32), or (ii) counter-clockwise to disengage said one or more male threads (47) of said fastener element (40) from one or more of said female threads (39) of said sleeve (32).

In another embodiment of this invention, the cemented dental crown removal system of this invention, as described herein, includes wherein each of said one or more male threads (47) of said fastener element (40) has a diameter that is smaller relative to a diameter of each of said one or more female threads (39) of said sleeve (32).

In another embodiment of this invention, the cemented dental crown removal system of this invention, as described herein, includes wherein said head (46) of said fastener element (40) has a detent (48) that is recessed in the top exterior surface (41) of said fastener element (40).

Similar to that described and shown in FIGS. 2, 3, 4A, 4B, 4C, 4D, 6, 8, and 9 concerning the exterior occlusal wall, in another embodiment of this invention, the cemented dental crown removal system of this invention, as described herein, includes wherein a portion of said exterior lingual wall (15) has a hole (or void) located on said exterior of said lingual wall (15), wherein said hole or void extends through said exterior lingual wall (15), through said lingual middle section (28), and through said interior lingual wall (27) of said dental crown (4) forming a second passageway that extends through said exterior lingual wall (15), through said lingual middle section (28), and through said interior lingual wall (27), and wherein said sleeve (32) is located within said hole of said exterior lingual wall (15) and said second passageway, wherein said sleeve (32) has an exterior surface (33), a cylindrically shaped interior surface (34), and a middle section (35) disposed between said exterior surface (33) of said sleeve (32) and said interior surface (34) of said sleeve (32), and wherein said sleeve (32) has a first end (36), and a second end (37), wherein said second end (37) of said sleeve (32) is disposed opposite to said first end (36) of said sleeve (32), and wherein said sleeve (32) has a vertical length (37) extending from said first end (36) of said sleeve (32) through said second end (37) of said sleeve (32), wherein at least a portion of said vertical length (37) of said sleeve (32) extends through said exterior lingual wall (15), said lingual middle section (28), and said interior lingual wall (27) of said dental crown (4), and wherein said cylindrically shaped interior surface (34) of said sleeve (32) has one or more female threads (39), and wherein said second end (37) of said sleeve (32) is in juxtaposition to said exterior surface (16) of said abutment (3) or to said top surface (17) of said second end (9) of said abutment (3).

Similar to that described and shown in FIGS. 2, 3, 4A, 4B, 4C, 4D, 6, 8, and 9 concerning the exterior occlusal wall, in another embodiment of this invention, the cemented dental crown removal system of this invention, as described herein, includes wherein a portion of said exterior buccal wall (14) has a hole (or void) located on said exterior buccal wall (14), wherein said hole (or void) extends through said exterior buccal wall (14), through said buccal middle section (26), and through said interior buccal wall (25) of said dental crown (4) forming a third passageway that extends through said exterior buccal wall (14), through said buccal middle section (26), and through said interior buccal wall (25), and wherein said sleeve (32) is located within said hole of said exterior buccal wall (14) and said third passageway, wherein said sleeve (32) has an exterior surface (33), a cylindrically shaped interior surface (34), and a middle section (35) disposed between said exterior surface (33) of said sleeve (32) and said interior surface (34) of said sleeve (32), and wherein said sleeve (32) has a first end (36), and a second end (37), wherein said second end (37) of said sleeve (32) is disposed opposite to said first end (36) of said sleeve (32), and wherein said sleeve (32) has a vertical length (38) extending from said first end (36) of said sleeve (32) through said second end (37) of said sleeve (32), wherein at least a portion of said vertical length (38) of said sleeve (32) extends through said exterior buccal wall (14), said buccal middle section (26), and said interior buccal wall (25) of said dental crown (4), and wherein said cylindrically shaped interior surface (34) of said sleeve (32) has one or more female threads (39), and wherein said second end (37) of said sleeve (32) is in juxtaposition to said exterior surface (16) of said abutment (3) or to said top surface (17) of said second end (9) of said abutment (3).

In another embodiment of this invention, the cemented dental crown removal system of this invention, as described herein, includes a tool (50) comprising a first section (51) having a first end (53) and a second end (54) and a middle section (55) disposed between said first end (53) of said first section (51) and said second end (54) of said first section (51), wherein said first end (53) of said first section (51), said middle section (55) of said first section (51), and said second end (54) of said first section (51) of said tool (50) form an exterior wall (52) of said first section (51) of said tool (50), and wherein said first section (51) of said tool (50) has a top surface (56), wherein said top surface (56) of said first section (51) of said tool (50) is located in juxtaposition to and above said exterior wall (52) of said first section (51) and said first end (53) of said first section (51) of said tool (50), and wherein said top surface (56) of said first section (51) has at least one void (57) forming at least one tool detent (58) wherein said tool detent (58) is recessed within at least a portion of said first end (51) and said middle section (55) of said first section (51) of said tool (50), and wherein said middle section (55) of said first section (51) has a void (59) forming a tool passageway (60) wherein said tool passageway (60) extends through said exterior wall (52) of said first section (51) and said middle section (55) of said first section (51), and a second section (61) that is located in juxtaposition to and below said first section (51) of said tool (50), wherein said second section (61) has one or more male threads (62) extending from below said second end (54) of said first section (51) in a vertical direction in relationship to said first section (51) of said tool (50).

In another embodiment of this invention, the cemented dental crown removal system of this invention, as described herein, includes wherein a filament member (63) is inserted into said void (59) of said middle section (55) of said first section (51) and through said tool passageway (60).

In another embodiment of this invention, the cemented dental crown removal system of this invention, as described herein, includes wherein said top surface (56) of said first section (51) of said tool (50) has one or more protrusions (i.e. raised bumps) (64) for gripping said tool (50).

In another embodiment of this invention, the cemented dental crown removal system of this invention, as described herein, includes wherein said fastener element (40) is removed from said exterior occlusal wall (11) and from said sleeve (32) of said dental crown (4), and wherein one or more of said male threads (62) of said second section (61) of said tool (50) are in engagement with one or more of said female threads (39) of said sleeve (32).

In another embodiment of this invention, the cemented dental crown removal system of this invention, as described herein, includes wherein one or more of said male threads (62) of said second section (61) of said tool (50) extend along said vertical length (38) of said sleeve (32) extending from said first end (36) of said sleeve (32) through said second end (37) of said sleeve (32), and wherein at least one of said male threads (62) of said second section (61) of said tool (50) abuts and engages at least a portion of said exterior surface (16) of said abutment (3).

In another embodiment of this invention, the cemented dental crown removal system of this invention, as described herein, includes wherein one or more of said male threads (62) of said second section (61) of said tool (50) extend along said vertical length (37) of said sleeve (32) extending from said first end (36) of said sleeve (32) through said second end (37) of said sleeve (32), and wherein at least one of said male threads (62) of said second section (61) of said tool (50) abuts and engages at least a portion of said top surface (17) of said second end (9) of said abutment (3).

In another embodiment of this invention, the cemented dental crown removal system of this invention, as described herein, includes wherein said tool (50) is mechanically turned or rotated in a circular 360 degree motion, either (i) clockwise to engage said one or more male threads (62) of said tool (50) against one or more of said female threads (39) of said sleeve (32) and to seat one of said male threads (62) against said abutment (3) for removal of said crown (4) from said abutment (3), or (ii) counter-clockwise to disengage said one or more male threads (62) of said tool (50) from engaging said abutment (3) and from said sleeve (32) of said crown (4).

In another embodiment of this invention, a method of removing a cemented dental crown from a dental abutment or dental implant comprising: providing a cemented dental crown removal system comprising a base implant (2), an abutment (3), and a novel dental crown (4); wherein the base implant (2) has a first end (5), a second end (6), and a middle section (7) disposed between said first end (5) and said second end (6) of said base implant (2); wherein said abutment (3) has an exterior surface (16) and a first end (8), a second end (9), and a middle section (10) disposed between said first end (8) and said second end (9) of said abutment (3), wherein said first end (8) of said abutment (3) is secured within said second end (6) of said base implant (2), and wherein said second end (9) of said abutment (3) has a top surface (17); wherein said dental crown (4) has an exterior occlusal wall (11), an interior occlusal wall (19), and an occlusal middle section (20) that is disposed between said exterior occlusal wall (11) and said interior occlusal wall (19), a mesial wall (12), a distal wall (13), an exterior buccal wall (14), an interior buccal wall (25), and a buccal middle section (26) that is disposed between said exterior buccal wall (14) and said interior buccal wall (25), an exterior lingual wall (15), an interior lingual wall (27), and a lingual middle section (28) that is disposed between said exterior lingual wall (15) and said interior lingual wall (27), and an open end (18) that is opposite to said exterior occlusal wall (11), and wherein said exterior occlusal wall (11), said mesial wall (12), said distal wall (13), said exterior buccal wall (14), said exterior lingual wall (15), said interior occlusal wall (19), said interior buccal wall (25), and said interior lingual wall (27) form a cup like tooth shape of said dental crown (4); wherein said mesial wall (12) is in juxtaposition to said exterior lingual wall (15), said exterior buccal wall ((14), and said exterior occlusal wall (11); wherein said exterior buccal wall (14) is in juxtaposition to said mesial wall (12), said distal wall (13), and said exterior occlusal wall (11); wherein said distal wall (13) is in juxtaposition to said exterior buccal wall (14), said exterior lingual wall (15), and said exterior occlusal wall (11); wherein said exterior lingual wall (15) is in juxtaposition to said distal wall (13), said mesial wall (12), and said exterior occlusal wall (11); and wherein said exterior occlusal wall (11) is in juxtaposition to said mesial wall (12), said exterior buccal wall (14), said distal wall (13), and said exterior lingual wall (15), such that said mesial wall (12), said exterior buccal wall (14), said distal wall (13), and said exterior lingual wall (15) each extend in a vertical direction away from a horizontal plane of said exterior occlusal wall; and wherein said interior occlusal wall (19) is positioned below said occlusal middle section (20), and wherein said interior buccal wall (25) is in juxtaposition to said interior occlusal wall (19), and wherein said interior lingual wall (27) is in juxtaposition to said interior occlusal wall (19), and wherein said interior lingual wall (27) is spaced apart and opposite to said interior buccal wall (25), and wherein said interior buccal wall (25), said interior lingual wall (27), and said interior occlusal wall (19) form said open end (18) of said dental crown (4); and wherein a portion of said exterior occlusal wall (11) has a hole (or void) (29) located on said exterior occlusal wall (11), wherein said hole (or void) (29) extends through said exterior occlusal wall (11), through said occlusal middle section (20), and through said interior occlusal wall (19) of said dental crown (4) forming a first passageway (30) that extends through said exterior occlusal wall (11), through said occlusal middle section (20), and said interior occlusal wall (19); a sleeve (FIG. 5, 32) that is located within said hole (29) of said exterior occlusal wall (11) and said first passageway (30), wherein said sleeve (32) has an exterior surface (33), a cylindrically shaped interior surface (34), and a middle section (35) disposed between said exterior surface (33) of said sleeve (32) and said interior surface (34) of said sleeve (32), and wherein said sleeve (32) has a first end (36), and a second end (37), wherein said second end (37) of said sleeve (32) is disposed opposite to said first end (36) of said sleeve (32), and wherein said sleeve (32) has a vertical length (38) extending from said first end (36) of said sleeve (32) through said second end (37) of said sleeve (32), wherein at least a portion of said vertical length (37) of said sleeve (32) extends through said exterior occlusal wall (11), said occlusal middle section (20), and said interior occlusal wall (19) of said dental crown (4), and wherein said cylindrically shaped interior surface (34) of said sleeve (32) has one or more female threads (39), and wherein said second end (37) of said sleeve (32) is in juxtaposition to said exterior surface (16) of said abutment (3) or to said top surface (17) of said second end (9) of said abutment (3); and a fastener element (40) having a top exterior surface (41) having a diameter, a body (45) having a first end (42), and a second end (43), and a middle section (44) that is disposed between said first end (42) of said body (45) and said second end (43) of said body (45), wherein said body (45) of said fastener element (40) is in juxtaposition to and disposed below said top exterior surface (41) of said fastener element (40), and wherein said body (45) of said fastener element (40) has a diameter that is smaller than said diameter of said top exterior surface (41) of said fastener element (40), and wherein said top exterior surface (41) of said fastener element (40) forms a head (46) of said fastener element (40), and wherein said body (45) of said fastener element (40) has one or more male threads (47); and wherein said one or more of said male threads (47) of said body (45) of said fastener element (40) engages one or more of said female threads (39) of said cylindrically shaped interior surface (34) of said sleeve (32), wherein said fastener element (40) is mechanically turned or rotated in a circular 360 degree motion clockwise to engage said one or more male threads (47) of said fastener element (40) against one or more of said female threads (39) of said sleeve (32) to seat at least a portion of said body (45) of said fastener element (40) within said interior surface (34) of said sleeve (32); providing a tool (50) comprising a first section (51) having a first end (53) and a second end (54) and a middle section (55) disposed between said first end (53) of said first section (51) and said second end (54) of said first section (51), wherein said first end (53) of said first section (51), said middle section (55) of said first section (51), and said second end (54) of said first section (51) form an exterior wall (52) of said first section (51) of said tool (50), and wherein said first section (51) of said tool (50) has a top surface (56), wherein said top surface (56) of said first section (51) of said tool (50) is located in juxtaposition to and above said exterior wall (52) of said first section (51) and said first end (53) of said first section (51) of said tool (50), and wherein said top surface (56) of said first section (51) has at least one void (57) forming at least one tool detent (58) wherein said tool detent (58) is recessed within at least a portion of said first end (51) and said middle section (55) of said first section (51) of said tool (50), and wherein said middle section (55) of said first section (51) has a void (59) forming a tool passageway (60) wherein said tool passageway (60) extends through said exterior wall (52) of said first section (51) and said middle section (55) of said first section (51) of said tool (50), and a second section (61) that is located in juxtaposition to and below said first section (51) of said tool (50), wherein said second section (61) has one or more male threads (62) extending from below said second end (54) of said first section (51) in a vertical direction in relationship to said first section (51) of said tool (50); removing said fastener element (40) from said exterior occlusal wall (11) of said abutment (3) by turning said head (46) of said fastener element (40) counter-clockwise to disengage said one or more male threads (47) of said fastener element (40) from one or more of said female threads (39) of said sleeve (32); and inserting said one or more of said male threads (62) of said second section (61) of said tool (50) into said first end (36) of said sleeve (32) of said crown (4) such that one or more of said male threads (62) of said second section (61) of said tool (50) engage one or more female threads (39) of said sleeve (32), and rotating said male threads (62) of said tool (50) in a clockwise direction along the said vertical length (37) of said sleeve (32) extending from said first end (36) of said sleeve (32) through said second end (37) of said sleeve (32), and continuing to rotate said male threads (62) of said tool (50) in said clockwise direction such that one of said male threads (62) of said second section (61) of said tool (50) abuts and engages at least a portion of said exterior surface (16) of said abutment (3) or at least a portion of said top surface (17) of said second end (9) of said abutment (3), and breaking a bond between said dental crown (4) and said abutment (3) or a dental implant.

In another embodiment of the method of removing a cemented dental crown from a dental abutment or dental implant of this invention, as described herein, includes rotating said male threads (62) of said tool (50) in a counterclockwise direction for disengaging said one or more male threads (62) of said tool (50) from said abutment (3) and from said sleeve (32) of said dental crown (4).

In another embodiment of the method of removing a cemented dental crown from a dental abutment or dental implant of this invention, as described herein, includes inserting a filament member (63) into said void (59) of said middle section (55) of said first section (51) of said tool (50) and through said tool passageway (60).

BRIEF DESCRIPTION OF THE DRAWINGS

FIG. 5 shows that a tapered exterior surface of the sleeve begins at the second end of the sleeve and continuously and progressively narrows along the entire vertical length of the sleeve in the direction toward the first end of the sleeve, and wherein the tapered exterior surface of the sleeve is free of any projections.

DETAILED DESCRIPTION OF THE INVENTION

The present invention provides a cemented dental crown removal system. The present invention thereby solves the present unmet need for a removable dental crown that may be removed without causing trauma and destruction to an abutment and/or a base implant of a dental implant to which the dental crown is secured.

As used herein, the term "juxtaposition" has the meaning of being placed side by side, such that at least a portion of a first member is in sealed engagement with at least a portion of the second member. For example, for illustrative purposes, a wall (i.e. the first member) of a square room is in juxtaposition to the ceiling (i.e. second member) of the room.

Figure 1:
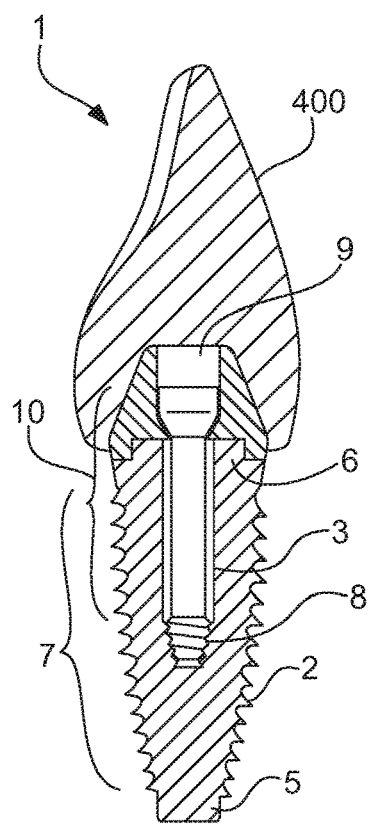
FIG. 1 shows a conventional dental implant that is known in the art.
Figure 2:
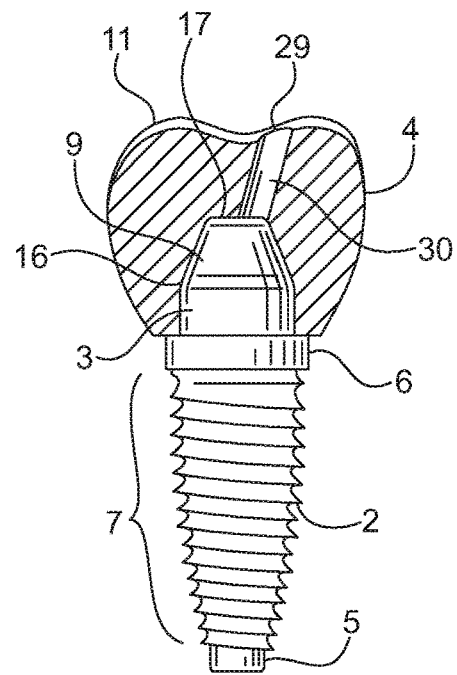
FIG. 2 shows an embodiment of the cemented dental removal system of the present invention wherein the crown (4) has a first passageway (30).
Figure 3:
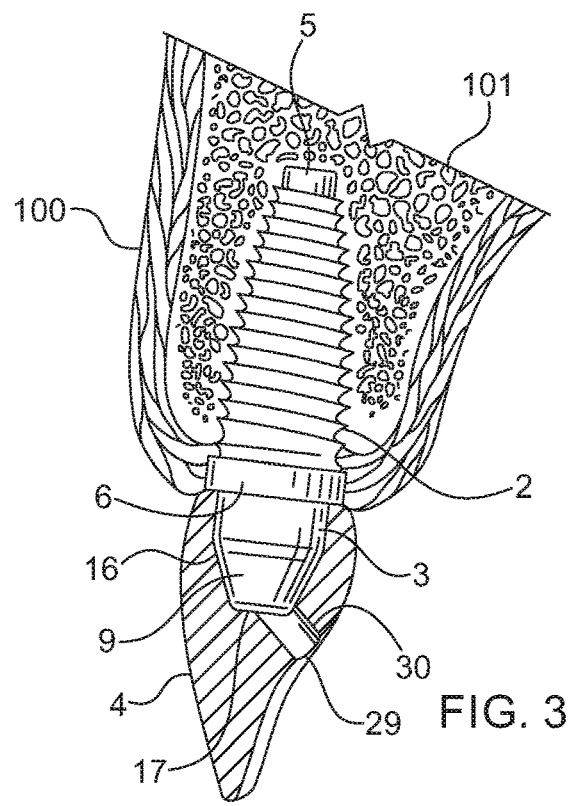
FIG. 3 shows an embodiment of the cemented dental removal system of the present invention wherein the crown (4) for an upper dentition tooth is shown above the gum line (100) of a patient and wherein the base implant (2) is inserted into the bone (101) of a patient.
Figure 4A:
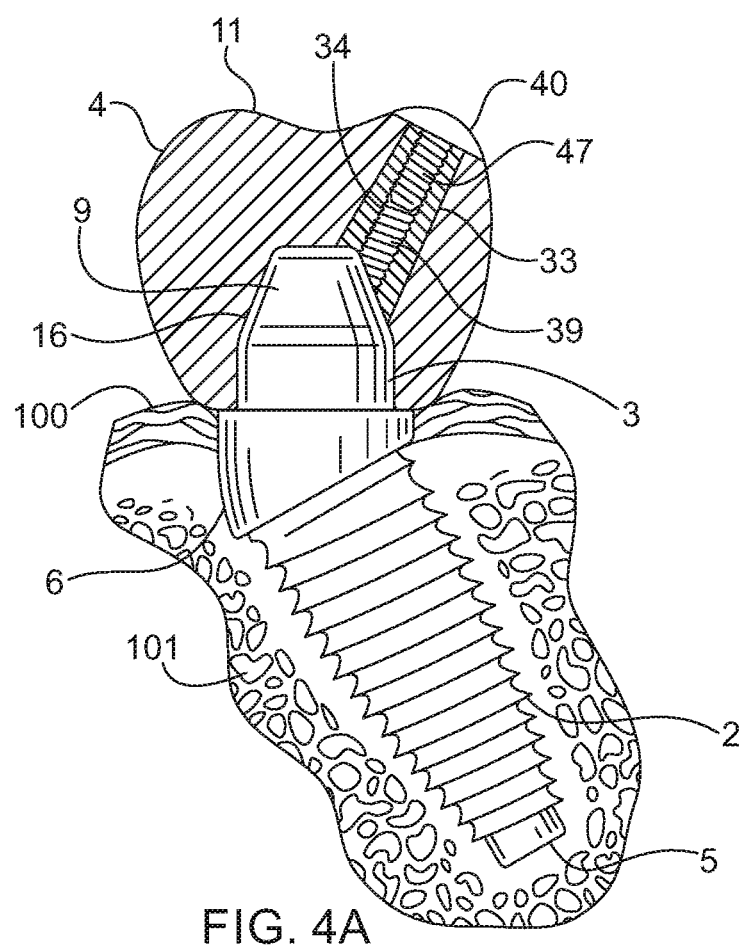
FIG. 4A shows an embodiment of the cemented dental removal system of the present invention wherein the crown (4) for a lower dentition tooth is shown above the gum line (100) of a patient and wherein the base implant (2) is inserted into the bone (101) of a patient, and wherein the fastener element (40) is engaged with the female threads (39) of the first passageway.
Figure 4B:
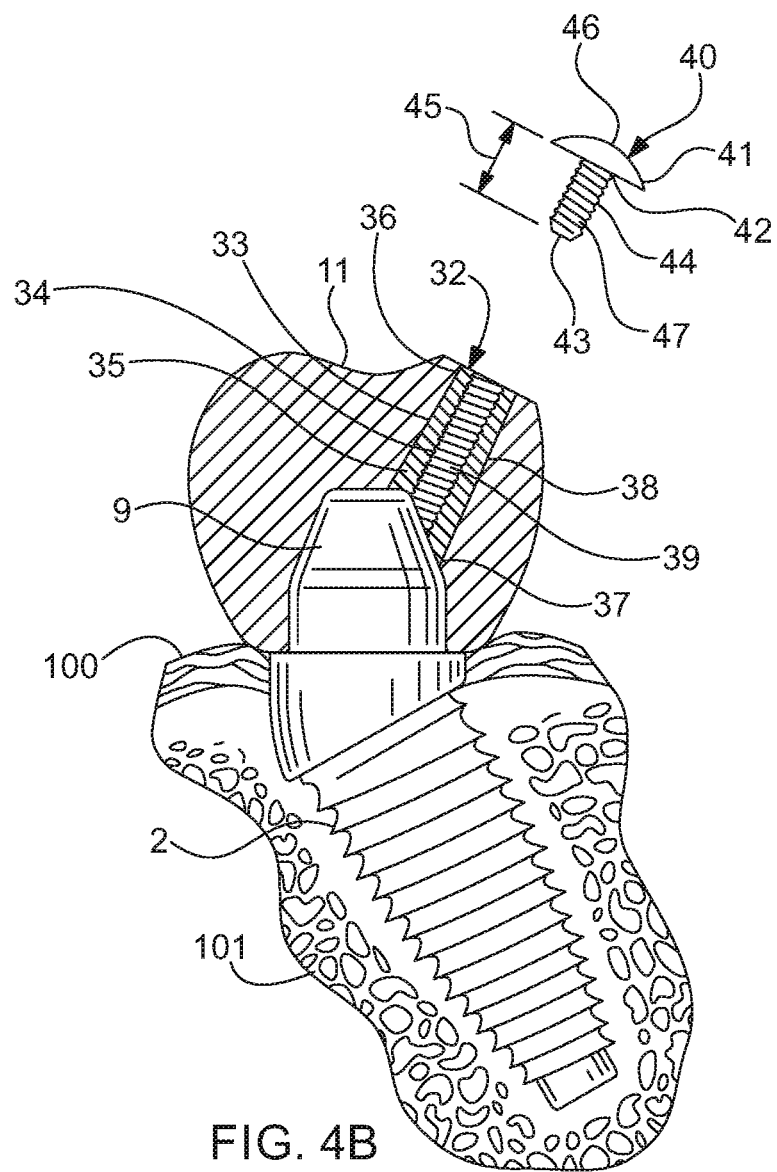
FIG. 4B shows an embodiment of the cemented dental removal system of the present invention wherein the crown (4) for a lower dentition tooth is shown above the gum line (100) of a patient and wherein the base implant (2) is inserted into the bone (101) of a patient, and wherein the fastener element (40) is disengaged from the female threads (39) of the first passageway.
Figure 4C:
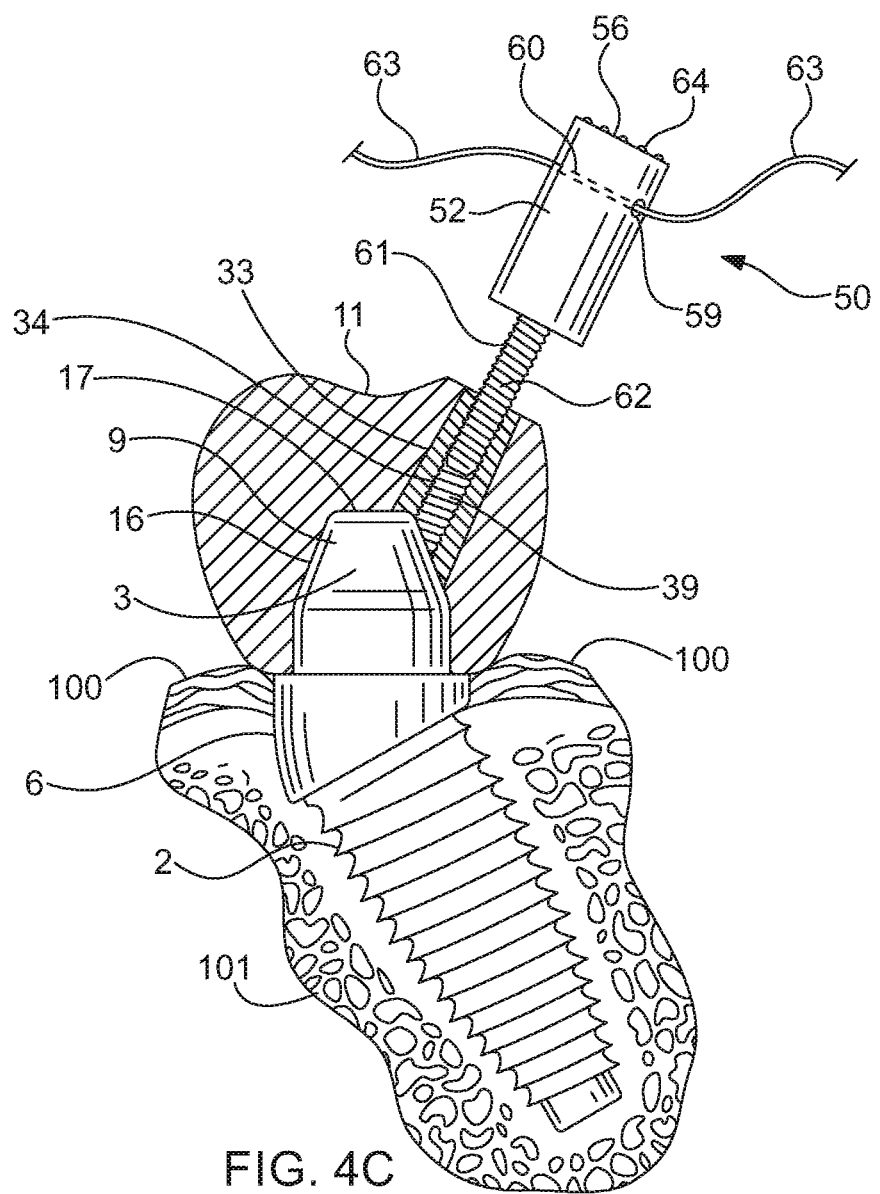
FIG. 4C shows an embodiment of the cemented dental removal system of the present invention wherein the crown (4) for a lower dentition tooth is shown above the gum line (100) of a patient and wherein the base implant (2) is inserted into the bone (101) of a patient, and wherein a portion of the male threads (62) of the second section (61) of the tool (50) are engaged with a portion of the female threads (39) of the first passageway.
Figure 4D:
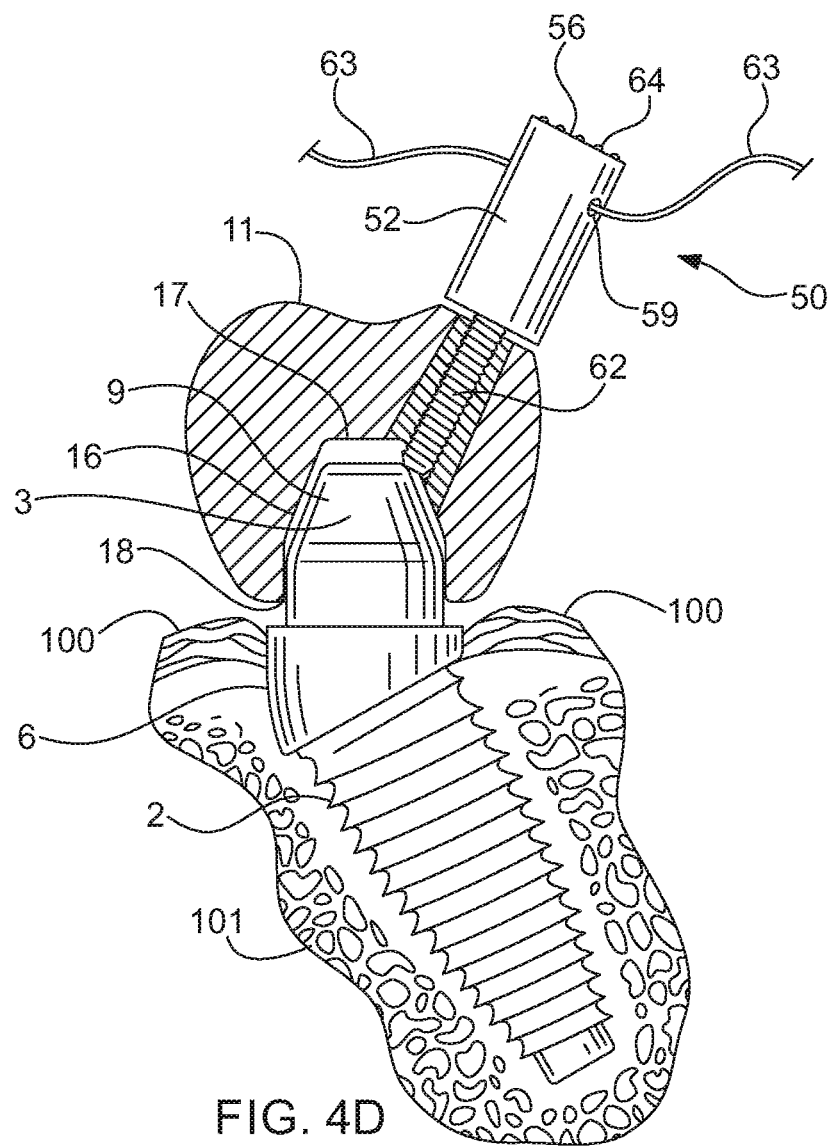
FIG. 4D shows an embodiment of the cemented dental removal system of the present invention wherein the crown (4) for a lower dentition tooth is shown above the gum line (100) of a patient and wherein the base implant (2) is inserted into the bone (101) of a patient, and wherein the male threads (62) of the second section (61) of the tool (50) are engaged with the female threads (39) of the first passageway and wherein one male thread (62) is abutted against the top surface (17) of the abutment (3) for breaking the bond between the crown (4) and the abutment (3).
Figure 5:
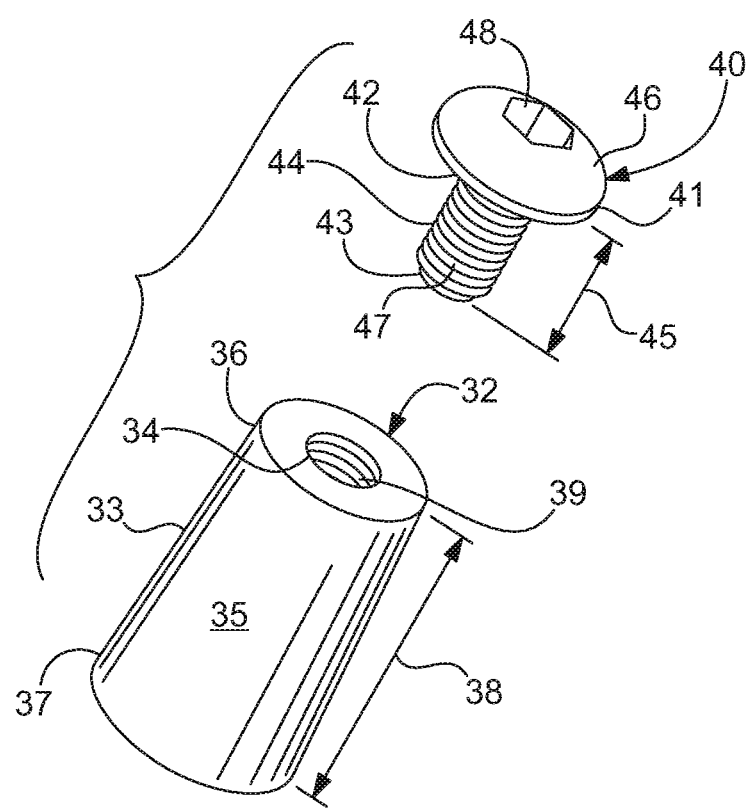
FIG. 5 shows an embodiment of the sleeve (32) of the crown (4) of the present invention.
Figure 6:
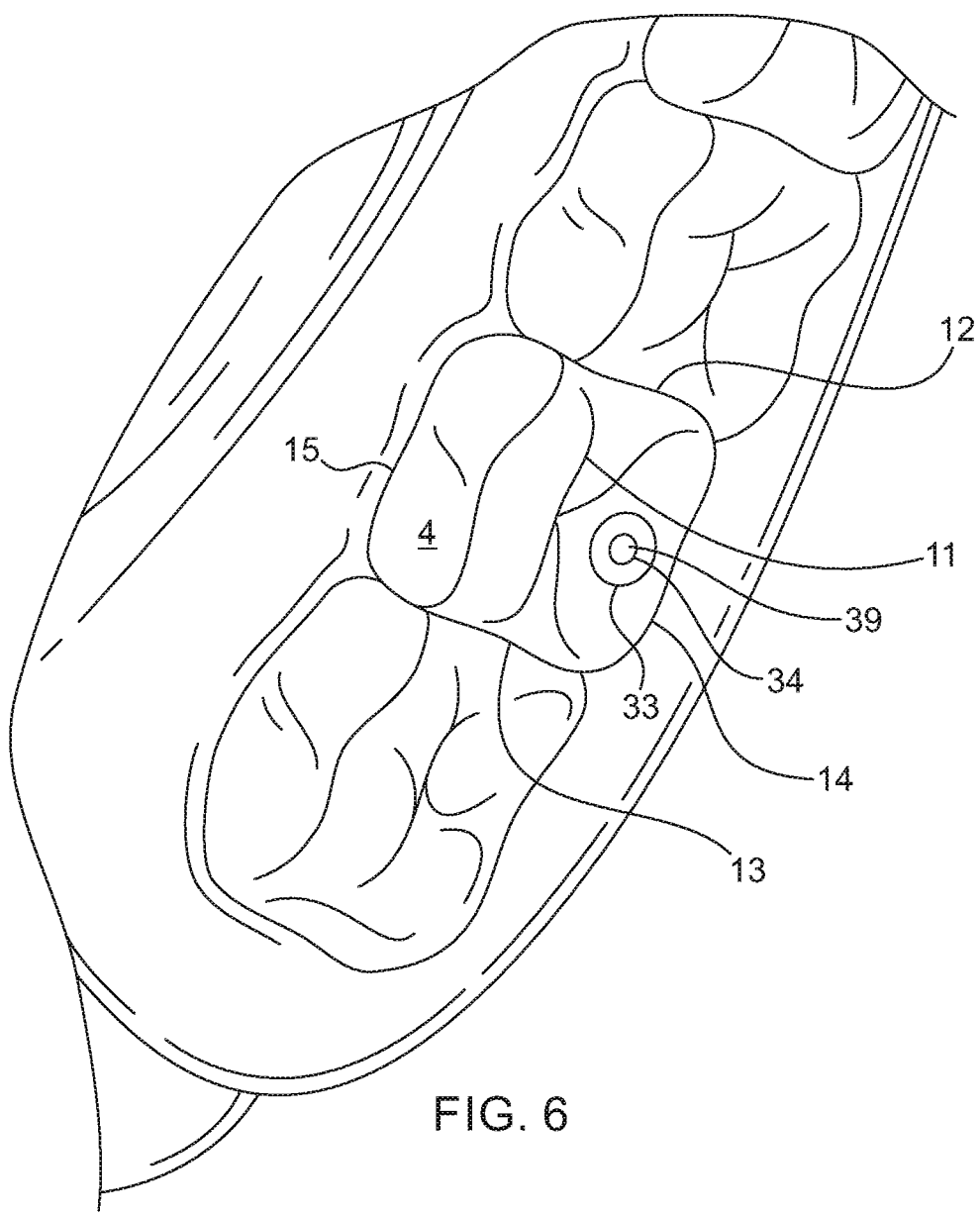
FIG. 6 shows a top view of the exterior occlusal wall (11) of the cemented dental crown removal system of the present invention.
Figure 7:
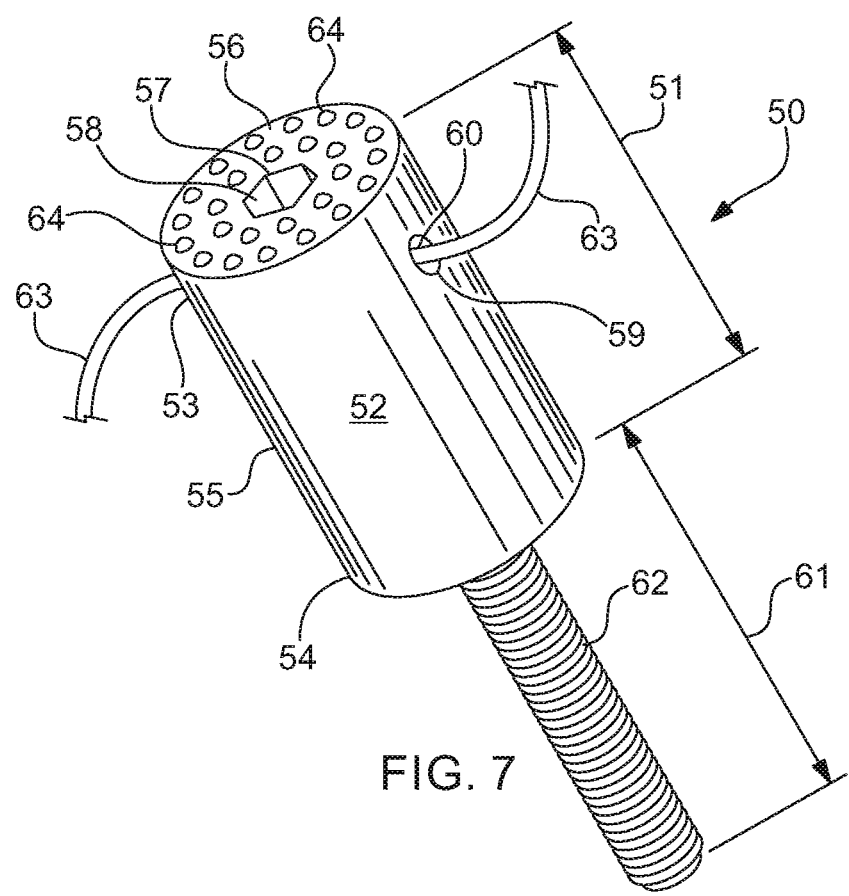
FIG. 7 shows an embodiment of the tool (50) of the cemented dental crown removal system of the present invention.
Figure 8:
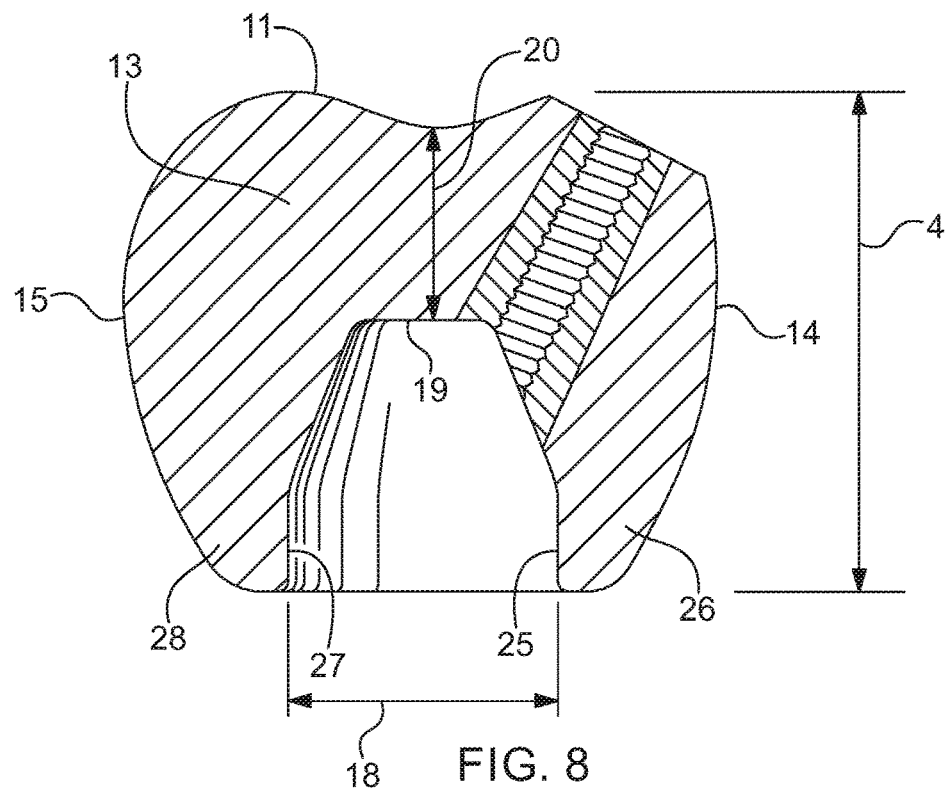
FIG. 8 shows an embodiment of the crown (4) of the cemented dental crown removal system of the present invention.
Figure 9:
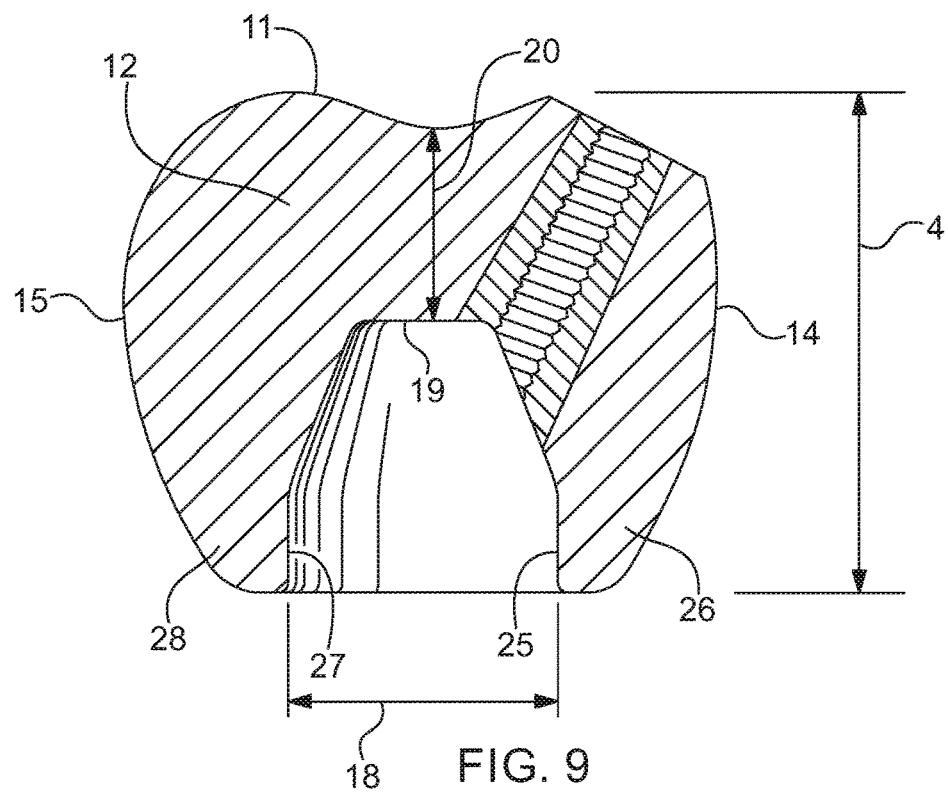
FIG. 9 shows an embodiment of the crown (4) of the cemented dental crown removal system of the present invention.

In one embodiment of this invention (as shown in FIGS. 1, 2, 3, 4A, 4B, 4C, 4D, 5, 6, 7, 8, and 9), a cemented dental crown removal system is provided comprising a base implant (2), an abutment (3), and a novel dental crown (4); wherein the base implant (2) has a first end (5), a second end (6), and a middle section (7) disposed between said first end (5) and said second end (6) of said base implant (2); wherein said abutment (3) has an exterior surface (16) and a first end (8), a second end (9), and a middle section (10) disposed between said first end (8) and said second end (9) of said abutment (3), wherein said first end (8) of said abutment (3) is secured within said second end (6) of said base implant (2), and wherein said second end (9) of said abutment (3) has a top surface (17); wherein said dental crown (4) has an exterior occlusal wall (11), an interior occlusal wall (19), and an occlusal middle section (20) that is disposed between said exterior occlusal wall (11) and said interior occlusal wall (19), a mesial wall (12), a distal wall (13), an exterior buccal wall (14), an interior buccal wall (25), and a buccal middle section (26) that is disposed between said exterior buccal wall (14) and said interior buccal wall (25), an exterior lingual wall (15), an interior lingual wall (27), and a lingual middle section (28) that is disposed between said exterior lingual wall (15) and said interior lingual wall (27), and an open end (18) that is opposite to said exterior occlusal wall (11), and wherein said exterior occlusal wall (11), said mesial wall (12), said distal wall (13), said exterior buccal wall (14), said exterior lingual wall (15), said interior occlusal wall (19), said interior buccal wall (25), and said interior lingual wall (27) form a cup like tooth shape of said dental crown (4); wherein said mesial wall (12) is in juxtaposition to said exterior lingual wall (15), said exterior buccal wall ((14), and said exterior occlusal wall (11); wherein said exterior buccal wall (14) is in juxtaposition to said mesial wall (12), said distal wall (13), and said exterior occlusal wall (11); wherein said distal wall (13) is in juxtaposition to said exterior buccal wall (14), said exterior lingual wall (15), and said exterior occlusal wall (11); wherein said exterior lingual wall (15) is in juxtaposition to said distal wall (13), said mesial wall (12), and said exterior occlusal wall (11); and wherein said exterior occlusal wall (11) is in juxtaposition to said mesial wall (12), said exterior buccal wall (14), said distal wall (13), and said exterior lingual wall (15), such that said mesial wall (12), said exterior buccal wall (14), said distal wall (13), and said exterior lingual wall (15) each extend in a vertical direction away from a horizontal plane of said exterior occlusal wall; and wherein said interior occlusal wall (19) is positioned below said occlusal middle section (20), and wherein said interior buccal wall (25) is in juxtaposition to said interior occlusal wall (19), and wherein said interior lingual wall (27) is in juxtaposition to said interior occlusal wall (19), and wherein said interior lingual wall (27) is spaced apart and opposite to said interior buccal wall (25), and wherein said interior buccal wall (25), said interior lingual wall (27), and said interior occlusal wall (19) form said open end (18) of said dental crown (4); and wherein a portion of said exterior occlusal wall (11) has a hole (or void) (29) located on said exterior occlusal wall (11), wherein said hole (or void) (29) extends through said exterior occlusal wall (11), through said occlusal middle section (20), and through said interior occlusal wall (19) of said dental crown (4) forming a first passageway (30) that extends through said exterior occlusal wall (11), through said occlusal middle section (20), and said interior occlusal wall (19); a sleeve (FIG. 5, 32) that is located within said hole (29) of said exterior occlusal wall (11) and said first passageway (30), wherein said sleeve (32) has an exterior surface (33), a cylindrically shaped interior surface (34), and a middle section (35) disposed between said exterior surface (33) of said sleeve (32) and said interior surface (34) of said sleeve (32), and wherein said sleeve (32) has a first end (36), and a second end (37), wherein said second end (37) of said sleeve (32) is disposed opposite to said first end (36) of said sleeve (32), and wherein said sleeve (32) has a vertical length (38) extending from said first end (36) of said sleeve (32) through said second end (37) of said sleeve (32), wherein said tapered exterior surface of said sleeve begins at said second end of said sleeve and continuously and progressively narrows along the entire said vertical length of said sleeve in the direction toward said first end of said sleeve, and wherein said tapered exterior surface is free of any projections, wherein at least a portion of said vertical length (37) of said sleeve (32) extends through said exterior occlusal wall (11), said occlusal middle section (20), and said interior occlusal wall (19) of said dental crown (4), and wherein said cylindrically shaped interior surface (34) of said sleeve (32) has one or more female threads (39), and wherein said first end of said sleeve is in juxtaposition to said exterior occlusal wall, and wherein said second end (37) of said sleeve (32) is in juxtaposition to said exterior surface (16) of said abutment or is in juxtaposition to said top surface (17) of said second end (9) of said abutment (3); and a fastener element (40) having a top exterior surface (41) having a diameter, a body (45) having a first end (42), and a second end (43), and a middle section (44) that is disposed between said first end (42) of said body (45) and said second end (43) of said body (45), wherein said body (45) of said fastener element (40) is in juxtaposition to and disposed below said top exterior surface (41) of said fastener element (40), and wherein said body (45) of said fastener element (40) has a diameter that is smaller than said diameter of said top exterior surface (41) of said fastener element (40), and wherein said top exterior surface (41) of said fastener element (40) forms a head (46) of said fastener element (40), and wherein said body (45) of said fastener element (40) has one or more male threads (47); and wherein said one or more of said male threads (47) of said body (45) of said fastener element (40) engages one or more of said female threads (39) of said cylindrically shaped interior surface (34) of said sleeve (32).

In another embodiment of this invention, the cemented dental crown removal system of this invention, as described herein, includes wherein said first end (42) of said fastener element (40) is engaged within said first end (36) of said sleeve (32).

In another embodiment of this invention, the cemented dental crown removal system of this invention, as described herein, includes wherein said fastener element (40) is a pin or a screw.

In another embodiment of this invention, the cemented dental crown removal system of this invention, as described herein, includes wherein said body (45) of said fastener element (40) is of a length that is suitable for extending into a portion of said vertical length (38) of said sleeve (32).

In another embodiment of this invention, the cemented dental crown removal system of this invention, as described herein, includes wherein said head (46) of said fastener element (40) is engaged against said exterior occlusal wall (11) of said dental crown (4).

In another embodiment of this invention, the cemented dental crown removal system of this invention, as described herein, includes wherein a diameter of said top exterior surface (41) of said fastener element (40) is larger than a diameter of said body (45) of said fastener element (40) and a diameter of said interior surface (34) of said sleeve (32), so that a portion of or all of said top exterior surface (41) of said fastener element (40) is retained on at least a portion of the exterior occlusal wall (11) of said dental crown (4).

In another embodiment of this invention, the cemented dental crown removal system of this invention, as described herein, includes wherein said fastener element (40) is mechanically turned or rotated in a circular 360 degree motion, either (i) clockwise to engage said one or more male threads (47) of said fastener element (40) against one or more of said female threads (39) of said sleeve (32) to seat at least a portion of said body (45) of said fastener element (40) within said interior surface (34) of said sleeve (32), or (ii) counter-clockwise to disengage said one or more male threads (47) of said fastener element (40) from engaging one or more of said female threads (39) of said sleeve (32).

In another embodiment of this invention, the cemented dental crown removal system of this invention, as described herein, includes wherein each of said one or more male threads (47) of said fastener element (40) has a diameter that is smaller relative to a diameter of each of said one or more female threads (39) of said sleeve (32).

In another embodiment of this invention, the cemented dental crown removal system of this invention, as described herein, includes wherein said head (46) of said fastener element (40) has a (head) detent (48) that is recessed in the top exterior surface (41) of said fastener element (40).

Similar to that described and shown in FIGS. 2, 3, 4A, 4B, 4C, 4D, 6, 8, and 9 concerning the exterior occlusal wall, in another embodiment of this invention, the cemented dental crown removal system of this invention, as described herein, includes wherein a portion of said exterior lingual wall (15) has a hole (or void) located on said exterior of said lingual wall (15), wherein said hole or void extends through said exterior lingual wall (15), through said lingual middle section (28), and through said interior lingual wall (27) of said dental crown (4) forming a second passageway that extends through said exterior lingual wall (15), through said lingual middle section (28), and through said interior lingual wall (27), and wherein said sleeve (32) is located within said hole of said exterior lingual wall (15) and said second passageway, wherein said sleeve (32) has an exterior surface (33), a cylindrically shaped interior surface (34), and a middle section (35) disposed between said exterior surface (33) of said sleeve (32) and said interior surface (34) of said sleeve (32), and wherein said sleeve (32) has a first end (36), and a second end (37), wherein said second end (37) of said sleeve (32) is disposed opposite to said first end (36) of said sleeve (32), and wherein said sleeve (32) has a vertical length (37) extending from said first end (36) of said sleeve (32) through said second end (37) of said sleeve (32), wherein at least a portion of said vertical length (37) of said sleeve (32) extends through said exterior lingual wall (15), said lingual middle section (28), and said interior lingual wall (27) of said dental crown (4), and wherein said cylindrically shaped interior surface (34) of said sleeve (32) has one or more female threads (39), and wherein said second end (37) of said sleeve (32) is in juxtaposition to said exterior surface (16) of said abutment (3) or is in juxtaposition to said top surface (17) of said second end (9) of said abutment (3).

Those persons skilled in the art will appreciate that the hole (29), first passageway (30), sleeve (32), and elements identified by numerals 33, 34, 35, 36, 37, 38, and 39, that are shown relative to the exterior occlusal wall (11) in FIGS. 2, 3, 4A, 4B, 4C, 4D, 6, 8, and 9, may be similarly physically placed on the exterior buccal wall (14) or the exterior lingual wall (15) of the crown (4). These various embodiments are not shown in the figures, however are described in full above and below, as examples of less preferred embodiments of this invention. The cemented dental crown removal system of this invention, as described herein, includes wherein a portion of said exterior buccal wall (14) has a hole (or void) located on said exterior buccal wall (14), wherein said hole (or void) extends through said exterior buccal wall (14), through said buccal middle section (26), and through said interior buccal wall (25) of said dental crown (4) forming a third passageway that extends through said exterior buccal wall (14), through said buccal middle section (26), and through said interior buccal wall (25), and wherein said sleeve (32) is located within said hole of said exterior buccal wall (14) and said third passageway, wherein said sleeve (32) has an exterior surface (33), a cylindrically shaped interior surface (34), and a middle section (35) disposed between said exterior surface (33) of said sleeve (32) and said interior surface (34) of said sleeve (32), and wherein said sleeve (32) has a first end (36), and a second end (37), wherein said second end (37) of said sleeve (32) is disposed opposite to said first end (36) of said sleeve (32), and wherein said sleeve (32) has a vertical length (38) extending from said first end (36) of said sleeve (32) through said second end (37) of said sleeve (32), wherein at least a portion of said vertical length (38) of said sleeve (32) extends through said exterior buccal wall (14), said buccal middle section (26), and said interior buccal wall (25) of said dental crown (4), and wherein said cylindrically shaped interior surface (34) of said sleeve (32) has one or more female threads (39), and wherein said second end (37) of said sleeve (32) is in juxtaposition to said exterior surface (16) of said abutment (3) or is in juxtaposition to said top surface (17) of said second end (9) of said abutment (3).

In another embodiment of this invention, the cemented dental crown removal system of this invention, as described herein, includes a tool (50) comprising a first section (51) having a first end (53) and a second end (54) and a middle section (55) disposed between said first end (53) of said first section (51) and said second end (54) of said first section (51), wherein said first end (53) of said first section (51), said middle section (55) of said first section (51), and said second end (54) of said first section (51) form an exterior wall (52) of said first section (51) of said tool (50), and wherein said first section (51) of said tool (50) has a top surface (56), wherein said top surface (56) of said first section (51) of said tool (50) is located in juxtaposition to and above said exterior wall (52) of said first section (51) and said first end (53) of said first section (51) of said tool (50), and wherein said top surface (56) of said first section (51) of said tool (50) has at least one void (57) forming at least one tool detent (58) wherein said tool detent (58) is recessed within at least a portion of said first end (51) and said middle section (55) of said first section (51) of said tool (50), and wherein said middle section (55) of said first section (51) has a void (59) forming a tool passageway (60) wherein said tool passageway (60) extends through said exterior wall (52) of said first section (51) and said middle section (55) of said first section (51), and a second section (61) that is located in juxtaposition to and below said first section (51) of said tool (50), wherein said second section (61) has one or more male threads (62) extending from below said second end (54) of said first section (51) in a vertical direction in relationship to said first section (51) of said tool (50).

In another embodiment of this invention, the cemented dental crown removal system of this invention, as described herein, includes wherein a filament member (63) is inserted into said void (59) of said middle section (55) of said first section (51) and through said tool passageway (60).

In another embodiment of this invention, the cemented dental crown removal system of this invention, as described herein, includes wherein said top surface (56) of said first section (51) of said tool (50) has one or more protrusions (i.e. raised bumps) (64) for gripping said tool (50).

In another embodiment of this invention, the cemented dental crown removal system of this invention, as described herein, includes wherein said fastener element (40) is removed from said exterior occlusal wall (11) and from said sleeve (32) of said dental crown (4), and wherein one or more of said male threads (62) of said second section (61) of said tool (50) are in engagement with one or more of said female threads (39) of said sleeve (32).

In another embodiment of this invention, the cemented dental crown removal system of this invention, as described herein, includes wherein one or more of said male threads

(62) of said second section (61) of said tool (50) extend along said vertical length (38) of said sleeve (32) extending from said first end (36) of said sleeve (32) through said second end (37) of said sleeve (32), and wherein at least one of said male threads (62) of said second section (61) of said tool (50) abuts and engages at least a portion of said exterior surface (16) of said abutment (3).

In another embodiment of this invention, the cemented dental crown removal system of this invention, as described herein, includes wherein one or more of said male threads (62) of said second section (61) of said tool (50) extend along said vertical length (37) of said sleeve (32) extending from said first end (36) of said sleeve (32) through said second end (37) of said sleeve (32), and wherein at least one of said male threads (62) of said second section (61) of said tool (50) abuts and engages at least a portion of said top surface (17) of said second end (9) of said abutment (3).

In another embodiment of this invention, the cemented dental crown removal system of this invention, as described herein, includes wherein said tool (50) is mechanically turned or rotated in a circular 360 degree motion, either (i) clockwise to engage said one or more male threads (62) of said tool (50) against one or more of said female threads (39) of said sleeve (32) and to seat one of said male threads (62) against said abutment (3) for removal of said crown (4) from said abutment (3), or (ii) counter-clockwise to disengage said one or more male threads (62) of said tool (50) from engaging said abutment (3) and from said sleeve (32) of said crown (4).

In another embodiment of this invention, a method of removing a cemented dental crown from a dental abutment or dental implant comprising: providing a cemented dental crown removal system comprising a base implant (2), an abutment (3), and a novel dental crown (4); wherein the base implant (2) has a first end (5), a second end (6), and a middle section (7) disposed between said first end (5) and said second end (6) of said base implant (2); wherein said abutment (3) has an exterior surface (16) and a first end (8), a second end (9), and a middle section (10) disposed between said first end (8) and said second end (9) of said abutment (3), wherein said first end (8) of said abutment (3) is secured within said second end (6) of said base implant (2), and wherein said second end (9) of said abutment (3) has a top surface (17); wherein said dental crown (4) has an exterior occlusal wall (11), an interior occlusal wall (19), and an occlusal middle section (20) that is disposed between said exterior occlusal wall (11) and said interior occlusal wall (19), a mesial wall (12), a distal wall (13), an exterior buccal wall (14), an interior buccal wall (25), and a buccal middle section (26) that is disposed between said exterior buccal wall (14) and said interior buccal wall (25), an exterior lingual wall (15), an interior lingual wall (27), and a lingual middle section (28) that is disposed between said exterior lingual wall (15) and said interior lingual wall (27), and an open end (18) that is opposite to said exterior occlusal wall (11), and wherein said exterior occlusal wall (11), said mesial wall (12), said distal wall (13), said exterior buccal wall (14), said exterior lingual wall (15), said interior occlusal wall (19), said interior buccal wall (25), and said interior lingual wall (27) form a cup like tooth shape of said dental crown (4); wherein said mesial wall (12) is in juxtaposition to said exterior lingual wall (15), said exterior buccal wall ((14), and said exterior occlusal wall (11); wherein said exterior buccal wall (14) is in juxtaposition to said mesial wall (12), said distal wall (13), and said exterior occlusal wall (11); wherein said distal wall (13) is in juxtaposition to said exterior buccal wall (14), said exterior lingual wall (15), and said exterior occlusal wall (11); wherein said exterior lingual wall (15) is in juxtaposition to said distal wall (13), said mesial wall (12), and said exterior occlusal wall (11); and wherein said exterior occlusal wall (11) is in juxtaposition to said mesial wall (12), said exterior buccal wall (14), said distal wall (13), and said exterior lingual wall (15), such that said mesial wall (12), said exterior buccal wall (14), said distal wall (13), and said exterior lingual wall (15) each extend in a vertical direction away from a horizontal plane of said exterior occlusal wall; and wherein said interior occlusal wall (19) is positioned below said occlusal middle section (20), and wherein said interior buccal wall (25) is in juxtaposition to said interior occlusal wall (19), and wherein said interior lingual wall (27) is in juxtaposition to said interior occlusal wall (19), and wherein said interior lingual wall (27) is spaced apart and opposite to said interior buccal wall (25), and wherein said interior buccal wall (25), said interior lingual wall (27), and said interior occlusal wall (19) form said open end (18) of said dental crown (4); and wherein a portion of said exterior occlusal wall (11) has a hole (or void) (29) located on said exterior occlusal wall (11), wherein said hole (or void) (29) extends through said exterior occlusal wall (11), through said occlusal middle section (20), and through said interior occlusal wall (19) of said dental crown (4) forming a first passageway (30) that extends through said exterior occlusal wall (11), through said occlusal middle section (20), and said interior occlusal wall (19); a sleeve (FIG. 5, 32) that is located within said hole (29) of said exterior occlusal wall (11) and said first passageway (30), wherein said sleeve (32) has an exterior surface (33), a cylindrically shaped interior surface (34), and a middle section (35) disposed between said exterior surface (33) of said sleeve (32) and said interior surface (34) of said sleeve (32), and wherein said sleeve (32) has a first end (36), and a second end (37), wherein said second end (37) of said sleeve (32) is disposed opposite to said first end (36) of said sleeve (32), and wherein said sleeve (32) has a vertical length (38) extending from said first end (36) of said sleeve (32) through said second end (37) of said sleeve (32), wherein at least a portion of said vertical length (37) of said sleeve (32) extends through said exterior occlusal wall (11), said occlusal middle section (20), and said interior occlusal wall (19) of said dental crown (4), and wherein said cylindrically shaped interior surface (34) of said sleeve (32) has one or more female threads (39), and wherein said second end (37) of said sleeve (32) is in juxtaposition to said exterior surface (16) of said abutment (3) or is in juxtaposition to said top surface (17) of said second end (9) of said abutment (3); and a fastener element (40) having a top exterior surface (41) having a diameter, a body (45) having a first end (42), and a second end (43), and a middle section (44) that is disposed between said first end (42) of said body (45) and said second end (43) of said body (45), wherein said body (45) of said fastener element (40) is in juxtaposition to and disposed below said top exterior surface (41) of said fastener element (40), and wherein said body (45) of said fastener element (40) has a diameter that is smaller than said diameter of said top exterior surface (41) of said fastener element (40), and wherein said top exterior surface (41) of said fastener element (40) forms a head (46) of said fastener element (40), and wherein said body (45) of said fastener element (40) has one or more male threads (47); and wherein said one or more of said male threads (47) of said body (45) of said fastener element (40) engages one or more of said female threads (39) of said cylindrically shaped interior surface (34) of said sleeve (32), wherein said fastener element (40) is mechanically turned or rotated in a circular 360 degree motion clockwise to engage said one or more male threads (47) of said fastener element (40) against one or more of said female threads (39) of said sleeve (32) to seat at least a portion of said body (45) of said fastener element (40) within said interior surface (34) of said sleeve (32); providing a tool (50) comprising a first section (51) having a first end (53) and a second end (54) and a middle section (55) disposed between said first end (53) of said first section (51) and said second end (54) of said first section (51) of said tool (50), wherein said first end (53) of said first section (51), said middle section (55) of said first section (51), and said second end (54) of said first section (51) of said tool (50) form an exterior wall (52) of said first section (51) of said tool (50), and wherein said first section (51) of said tool (50) has a top surface (56) wherein said top surface (56) of said first section (51) is located in juxtaposition to and above said exterior wall (52) of said first section (51) and said first end (53) of said first section (51) of said tool (50), and wherein said top surface (56) of said first section (51) has at least one void (57) forming at least one tool detent (58) wherein said tool detent (58) is recessed within at least a portion of said first end (51) and said middle section (55) of said first section (51) of said tool (50), and wherein said middle section (55) of said first section (51) of said tool (50) has a void (59) forming a tool passageway (60) wherein said tool passageway (60) extends through said exterior wall (52) of said first section (51) and said middle section (55) of said first section (51) of said tool (50), and a second section (61) that is located in juxtaposition to and below said first section (51) of said tool (50), wherein said second section (61) has one or more male threads (62) extending from below said second end (54) of said first section (51) of said tool (50) in a vertical direction in relationship to said first section (51) of said tool (50); removing said fastener element (40) from said exterior occlusal wall (11) of said abutment (3) by turning said head (46) of said fastener element (40) counter-clockwise to disengage said one or more male threads (47) of said fastener element (40) from one or more of said female threads (39) of said sleeve (32); and inserting said one or more of said male threads (62) of said second section (61) of said tool (50) into said first end (36) of sleeve (32) of said crown (4) such that one or more of said male threads (62) of said second section (61) of said tool (50) engage one or more female threads (39) of said sleeve (32), and rotating said male threads (62) of said tool (50) in a clockwise direction along the said vertical length (37) of said sleeve (32) extending from said first end (36) of said sleeve (32) through said second end (37) of said sleeve (32), and continuing to rotate said male threads (62) of said tool (50) in said clockwise direction such that one of said male threads (62) of said second section (61) of said tool (50) abuts and engages at least a portion of said exterior surface (16) of said abutment (3) or at least a portion of said top surface (17) of said second end (9) of said abutment (3) for breaking a bond between said dental crown (4) and said abutment (3) or a dental implant.

In another embodiment of the method of removing a cemented dental crown from a dental abutment or dental implant of this invention, as described herein, includes rotating said male threads (62) of said tool (50) in a counterclockwise direction for disengaging said one or more male threads (62) of said tool (50) from engaging said abutment (3) and from said sleeve (32) of said dental crown (4).

In another embodiment of the method of removing a cemented dental crown from a dental abutment or dental implant of this invention, as described herein, includes inserting a filament member (63) into said void (59) of said middle section (55) of said first section (51) of said tool (50) and through said tool passageway (60). The filament member has a diameter that is smaller than the diameter of the void (59), the middle section (55) of said first section (51), and the tool passageway (60) of said tool (50). The filament member may be made of any material suitable for dental use, for example but not limited to, cotton fiber, dental floss material, string, or wire.

The novel dental crown (4) of this invention is preferably in the shape of a naturally occurring tooth.

It will be appreciated that the holes or voids and the passageways as described herein in said dental crown (4), each have a diameter that may be any size that is smaller than the surface area of any of the exterior walls as described herein of the dental crown (4). Preferably the holes and the passageway(s) of the dental crown (4), as described herein, have a diameter that is from 1 mm (millimeter) to 5 mm.

In other embodiments of this invention, those persons skilled in the art shall appreciate that the fastener element may be a pin device. The pin device may have a lockable element (not shown in the figures) for securing the dental crown (4) to an abutment (3). Those persons skilled in the art will appreciate that the pin device is un-lockable for disengaging the dental crown from the abutment of a dental implant by removing the pin device from the abutment.

Preferably, the dental crown (4) of this invention has an exterior occlusal wall, a mesial wall, a distal wall, an exterior buccal wall, and an exterior lingual wall thicknesses of up to about 2 millimeters. The dental crown (4) is preferably made of porcelain, gold, zirconia, or other suitable dental materials. The fastener element (40) of this invention is preferably made of a metal and coated with a porcelain veneer. The tool (50) of this invention is preferably made of a metal.

Those persons skilled in the art understand that any conventional known in the art dental hand wrench or screwdriver (not part of this invention, for example, but not limited to, an allen wrench, a phillips screwdriver, or known pneumatic dental hand tool) may be used to mechanically tighten or loosen the fastener element (40) and the tool (50) of this invention.

Those persons skilled in the art will appreciate that a cemented dental crown removal system is provided having a base implant, an abutment, and a dental crown having a passageway with a sleeve with one or more female threads. The sleeve is in juxtaposition to the abutment. The sleeve accommodates a removable fastener element. When the fastener element is removed from the sleeve of the crown, a tool having one or more male threads is inserted into the sleeve and rotated in the clock-wise direction to engage one or more female threads of the sleeve and wherein one or male threads of the tool is rotated further in the clock-wise direction such that one or more male threads are made to bias against (engage) the exterior surface of the abutment or bias against (engage) the top surface of the abutment, thereby breaking the cemented bond between the crown and the abutment of the dental implant. Thus, those persons skilled in the art will appreciate that a method of removing a cemented dental crown using the cemented dental crown removal system of this invention is provided.

The figures of this application are not intended to limit the scope of the present invention as described herein. The figures are for purpose of illustration of the preferred embodiments of this invention. It will be understood by those persons skilled in the art that numerous variations and details of the instant invention may be made without departing from the instant invention as set forth herein.

What is claimed is:

1. A cemented dental crown removal system comprising a base implant, an abutment, and a dental crown;
   wherein said base implant has a first end, a second end, and a middle section disposed between said first end and said second end of said base implant;
   wherein said abutment has an exterior surface and a first end, a second end, and a middle section disposed between said first end and said second end of said abutment, wherein said first end of said abutment is secured within said second end of said base implant, and wherein said second end of said abutment has a top surface;
   wherein said dental crown has an exterior occlusal wall, an interior occlusal wall, and an occlusal middle section that is disposed between said exterior occlusal wall and said interior occlusal wall, a mesial wall, a distal wall, an exterior buccal wall, an interior buccal wall, and a buccal middle section that is disposed between said exterior buccal wall and said interior buccal wall, an exterior lingual wall, an interior lingual wall, and a lingual middle section that is disposed between said exterior lingual wall and said interior lingual wall, and an open end that is opposite to said exterior occlusal wall, and wherein said exterior occlusal wall, said mesial wall, said distal wall, said exterior buccal wall, said exterior lingual wall, said interior occlusal wall, said interior buccal wall, and said interior lingual wall form a cup like tooth shape of said dental crown;
   wherein said mesial wall is in juxtaposition to said exterior lingual wall, said exterior buccal wall, and said exterior occlusal wall;
   wherein said exterior buccal wall is in juxtaposition to said mesial wall, said distal wall, and said exterior occlusal wall;
   wherein said distal wall is in juxtaposition to said exterior buccal wall, said exterior lingual wall, and said exterior occlusal wall;
   wherein said exterior lingual wall is in juxtaposition to said distal wall, said mesial wall, and said exterior occlusal wall;
   and wherein said exterior occlusal wall is in juxtaposition to said mesial wall, said exterior buccal wall, said distal wall, and said exterior lingual wall, such that said mesial wall, said exterior buccal wall, said distal wall, and said exterior lingual wall each extend in a vertical direction away from a horizontal plane of said exterior occlusal wall;
   and wherein said interior occlusal wall is positioned gingivally to said occlusal middle section, and wherein said interior buccal wall is in juxtaposition to said interior occlusal wall, and wherein said interior lingual wall is in juxtaposition to said interior occlusal wall, and wherein said interior lingual wall is spaced apart and opposite to said interior buccal wall, and wherein said interior buccal wall, said interior lingual wall, and said interior occlusal wall form said open end of said dental crown;
   and wherein a portion of said exterior occlusal wall has a hole or void located on said exterior occlusal wall, wherein said hole or void extends through said exterior occlusal wall, through said occlusal middle section, and through said interior occlusal wall of said dental crown forming a first passageway that extends through said exterior occlusal wall, through said occlusal middle section, and said interior occlusal wall;
   a sleeve that is located within said hole or void and said first passageway, wherein said sleeve has a tapered exterior surface, a cylindrically shaped interior surface, and a middle section disposed between said tapered exterior surface of said sleeve and said interior surface of said sleeve, and wherein said sleeve has a first end, and a second end, wherein said second end of said sleeve is disposed opposite to said first end of said sleeve, and wherein said sleeve has a vertical length extending from said first end of said sleeve through said second end of said sleeve, wherein said tapered exterior surface of said sleeve begins at said second end of said sleeve and continuously and progressively narrows along the entire said vertical length of said sleeve in the direction toward said first end of said sleeve, and wherein said tapered exterior surface is free of any projections, wherein at least a portion of said vertical length of said sleeve extends through said exterior occlusal wall, said occlusal middle section, and said interior occlusal wall of said dental crown, and wherein said cylindrically shaped interior surface of said sleeve has one or more female threads, and wherein said first end of said sleeve is in juxtaposition to said exterior occlusal wall, and wherein said second end of said sleeve is in juxtaposition to said exterior surface of said abutment or is in juxtaposition to said top surface of said second end of said abutment;
   and a fastener element having a top exterior surface having a diameter, a body having a first end, and a second end, and a middle section that is disposed between said first end of said body and said second end of said body, wherein said body of said fastener element is in juxtaposition to and disposed gingivally to said top exterior surface of said fastener element, and wherein said body of said fastener has a diameter that is smaller than said diameter of said top exterior surface of said fastener element, and wherein said top exterior surface of said fastener element forms a head of said fastener element, and wherein said body of said fastener element has one or more male threads; and wherein said one or more of said male threads of said body of said fastener element engages one or more of said female threads of said cylindrically shaped interior surface of said sleeve.

2. The cemented dental crown removal system of claim 1 wherein said first end of said fastener element is engaged within said first end of said sleeve.

3. The cemented dental crown removal system of claim 1 wherein said fastener element is a pin or a screw.

4. The cemented dental crown removal system of claim 1 wherein said body of said fastener element is of a length that is suitable for extending into a portion of said vertical length of said sleeve.

5. The cemented dental crown removal system of claim 1 wherein said head of said fastener element is engaged against said exterior occlusal wall of said dental crown.

6. The cemented dental crown removal system of claim 1 wherein said diameter of said top exterior surface of said fastener element is larger than said diameter of said body of said fastener element and a diameter of said interior surface of said sleeve, so that a portion of or all of said top exterior surface of said fastener element is retained on at least a portion of the exterior occlusal wall of said dental crown.

7. The cemented dental crown removal system of claim 1 wherein said fastener element is mechanically turned or rotated in a circular 360 degree motion, either (i) clockwise to engage said one or more male threads of said fastener element against one or more of said female threads of said sleeve to seat at least a portion of said body of said fastener element within said interior surface of said sleeve, or (ii) counter-clockwise to disengage said one or more male threads of said fastener element from one or more of said female threads of said sleeve.

8. The cemented dental crown removal system of claim 7 wherein each of said one or more male threads of said fastener element has a diameter that is smaller relative to a diameter of each of said one or more female threads of said sleeve.

9. The cemented dental crown removal system of claim 1 wherein said head of said fastener element has a head detent that is recessed in the top exterior surface of said fastener element.

10. The cemented dental crown removal system of claim 1 including a tool comprising a first section having a first end and a second end and a middle section disposed between said first end of said first section and said second end of said first section of said tool, wherein said first end of said first section, said middle section of said first section, and said second end of said first section of said tool form an exterior wall of said first section of said tool, and wherein said first section of said tool has a top surface, wherein said top surface of said first section of said tool is located in juxtaposition to and above said exterior wall of said first section and said first end of said first section of said tool, and wherein said top surface of said first section of said tool has at least one void forming at least one tool detent wherein said tool detent is recessed within at least a portion of said first end and said middle section of said first section of said tool, and wherein said middle section of said first section of said tool has a void forming a tool passageway wherein said tool passageway extends through said exterior wall of said first section and said middle section of said first section of said tool, and a second section of said tool that is located in juxtaposition to and gingivally to said first section of said tool, wherein said second section of said tool has one or more male threads extending gingivally from said second end of said first section of said tool in a vertical direction in relationship to said first section of said tool.

11. The cemented dental crown removal system of claim 10 wherein a filament member is inserted into said void of said middle section of said first section of said tool and through said tool passageway.

12. The cemented dental crown removal system of claim 10 wherein said top surface of said first section of said tool has one or more protrusions for gripping said tool.

13. The cemented dental crown removal system of claim 10 wherein said fastener element is removed from said exterior occlusal wall and from said sleeve of said dental crown, and wherein one or more of said male threads of said second section of said tool are in engagement with one or more of said female threads of said sleeve.

14. The cemented dental crown removal system of claim 13 wherein one or more of said male threads of said second section of said tool extend along said vertical length of said sleeve extending from said first end of said sleeve through said second end of said sleeve, and wherein at least one of said male threads of said second section of said tool abuts and engages at least a portion of said exterior surface of said abutment.

15. The cemented dental crown removal system of claim 13 wherein one or more of said male threads of said second section of said tool extend along said vertical length of said sleeve extending from said first end of said sleeve through said second end of said sleeve, and wherein at least one of said male threads of said second section of said tool abuts and engages at least a portion of said top surface of said second end of said abutment.

16. The cemented dental crown removal system of claim 13 wherein said tool is mechanically turned or rotated in a circular 360 degree motion, either (i) clockwise to engage said one or more male threads of said tool against one or more of said female threads of said sleeve and to seat said male threads of said second section of said tool against said abutment for removal of said crown from said abutment, or (ii) counter-clockwise to disengage said one or more male threads of said tool from engaging said abutment and from said sleeve of said crown.

17. A method of removing a cemented dental crown from a dental abutment or dental implant comprising:
providing a cemented dental crown removal system comprising a base implant, an abutment, and a dental crown, wherein said base implant has a first end, a second end, and a middle section disposed between said first end and said second end of said base implant, wherein said abutment has an exterior surface and a first end, a second end, and a middle section disposed between said first end and said second end of said abutment, wherein said first end of said abutment is secured within said second end of said base implant, and wherein said second end of said abutment has a top surface, wherein said dental crown has an exterior occlusal wall, an interior occlusal wall, and an occlusal middle section that is disposed between said exterior occlusal wall and said interior occlusal wall, a mesial wall, a distal wall, an exterior buccal wall, an interior buccal wall, and a buccal middle section that is disposed between said exterior buccal wall and said interior buccal wall, an exterior lingual wall, an interior lingual wall, and a lingual middle section that is disposed between said exterior lingual wall and said interior lingual wall, and an open end that is opposite to said exterior occlusal wall, and wherein said exterior occlusal wall, said mesial wall, said distal wall, said exterior buccal wall, said exterior lingual wall, said interior occlusal wall, said interior buccal wall, and said interior lingual wall form a cup like tooth shape of said dental crown, wherein said mesial wall is in juxtaposition to said exterior lingual wall, said exterior buccal wall, and said exterior occlusal wall, wherein said exterior buccal wall is in juxtaposition to said mesial wall, said distal wall, and said exterior occlusal wall, wherein said distal wall is in juxtaposition to said exterior buccal wall, said exterior lingual wall, and said exterior occlusal wall, wherein said exterior lingual wall is in juxtaposition to said distal wall, said mesial wall, and said exterior occlusal wall, and wherein said exterior occlusal wall is in juxtaposition to said mesial wall, said exterior buccal wall, said distal wall, and said exterior lingual wall, such that said mesial wall, said exterior buccal wall, said distal wall, and said exterior lingual wall each extend in a vertical direction away from a horizontal plane of said exterior occlusal wall, and wherein said interior occlusal wall is positioned gingivally to said occlusal middle section, and wherein said interior buccal wall is in juxtaposition to said interior occlusal wall, and wherein said interior lingual wall is in juxtaposition to said interior occlusal wall, and wherein said interior lingual wall is spaced apart and opposite to said interior buccal wall, and wherein said interior buccal wall, said interior lingual wall, and said interior occlusal wall form said open end of said dental crown, and wherein a portion of said exterior occlusal wall has a hole or void located on said exterior occlusal wall, wherein said hole or void extends through said exterior occlusal wall, through said occlusal middle section, and through said interior occlusal wall of said dental crown forming a first passageway that extends through said exterior occlusal wall, through said occlusal middle section, and said interior occlusal wall, a sleeve that is located within said hole or void and said first passageway, wherein said sleeve has a tapered exterior surface, a cylindrically shaped interior surface, and a middle section disposed between said tapered exterior surface of said sleeve and said interior surface of said sleeve, and wherein said sleeve has a first end, and a second end, wherein said second end of said sleeve is disposed opposite to said first end of said sleeve, and wherein said sleeve has a vertical length extending from said first end of said sleeve through said second end of said sleeve, wherein said tapered exterior surface of said sleeve begins at said second end of said sleeve and continuously and progressively narrows along the entire said vertical length of said sleeve in the direction toward said first end of said sleeve, and wherein said tapered exterior surface is free of any projections, wherein at least a portion of said vertical length of said sleeve extends through said exterior occlusal wall, said occlusal middle section, and said interior occlusal wall of said dental crown, and wherein said cylindrically shaped interior surface of said sleeve has one or more female threads, and wherein said first end of said sleeve is in juxtaposition to said exterior occlusal wall, and wherein said second end of said sleeve is in juxtaposition to said exterior surface of said abutment or is in juxtaposition to said top surface of said second end of said abutment, and a fastener element having a top exterior surface having a diameter, a body having a first end, and a second end, and a middle section that is disposed between said first end of said body and said second end of said body, wherein said body of said fastener element is in juxtaposition to and disposed gingivally to said top exterior surface of said fastener element, and wherein said body of said fastener has a diameter that is smaller than said diameter of said top exterior surface of said fastener element, and wherein said top exterior surface of said fastener element forms a head of said fastener element, and wherein said body of said fastener element has one or more male threads, and wherein said one or more of said male threads of said body of said fastener element engages one or more of said female threads of said cylindrically shaped interior surface of said sleeve, wherein said fastener element is mechanically turned or rotated in a circular 360 degree motion clockwise to engage said one or more male threads of said fastener element against one or more of said female threads of said sleeve to seat at least a portion of said body of said fastener element within said interior surface of said sleeve;

providing a tool comprising a first section having a first end and a second end and a middle section disposed between said first end of said first section and said second end of said first section of said tool, wherein said first end of said first section, said middle section of said first section, and said second end of said first section of said tool form an exterior wall of said first section of said tool, and wherein said first section of said tool has a top surface, wherein said top surface of said first section of said tool is located in juxtaposition to and above said exterior wall of said first section and said first end of said first section of said tool, and wherein said top surface of said first section of said tool has at least one void forming at least one tool detent wherein said tool detent is recessed within at least a portion of said first end and said middle section of said first section of said tool, and wherein said middle section of said first section of said tool has a void forming a tool passageway wherein said tool passageway extends through said exterior wall of said first section and said middle section of said first section of said tool, and a second section that is located in juxtaposition to and below said first section of said tool, wherein said second section of said tool has one or more male threads extending from below said second end of said first section of said tool in a vertical direction in relationship to said first section of said tool;

removing said fastener element from said exterior occlusal wall of said abutment by turning said head of said fastener element counter-clockwise to disengage said one or more male threads of said fastener element from one or more of said female threads of said sleeve; and inserting said one or more of said male threads of said second section of said tool into said first end of said sleeve of said crown such that one or more of said male threads of said second section of said tool engage one or more of said female threads of said sleeve, and rotating said male threads of said tool in a clockwise direction along the said vertical length of said sleeve extending from said first end of said sleeve through said second end of said sleeve, and continuing to rotate said male threads of said tool in said clockwise direction such that one or more of said male threads of said second section of said tool abuts and engages at least a portion of said exterior surface of said abutment or at least a portion of said top surface of said second end of said abutment for breaking a bond between said dental crown and said abutment or said dental implant.

18. The method of removing a cemented dental crown from a dental abutment or dental implant of claim 17 including rotating said male threads of said tool in a counterclockwise direction for disengaging said one or more male threads of said tool from engaging said abutment and from said sleeve of said dental crown.

19. The method of removing a cemented dental crown from a dental abutment or dental implant of claim 17 including inserting a filament member into said void of said middle section of said first section of said tool and through said tool passageway.

* * * * *